(12) United States Patent
Mizrachi et al.

(10) Patent No.: US 8,516,454 B2
(45) Date of Patent: Aug. 20, 2013

(54) EFFICIENT PARALLEL COMPUTATION OF DEPENDENCY PROBLEMS

(75) Inventors: Shay Mizrachi, Hod-Hasharon (IL); Uri Tal, Netanya (IL); Tomer Ben-David, Yavne (IL)

(73) Assignee: Rocketick Technologies Ltd., Ramat Gan (IL)

( * ) Notice: Subject to any disclaimer, the term of this patent is extended or adjusted under 35 U.S.C. 154(b) by 350 days.

(21) Appl. No.: 12/994,153

(22) PCT Filed: Jun. 30, 2009

(86) PCT No.: PCT/IB2009/052820
§ 371 (c)(1),
(2), (4) Date: Nov. 23, 2010

(87) PCT Pub. No.: WO2010/004474
PCT Pub. Date: Jan. 14, 2010

(65) Prior Publication Data
US 2011/0067016 A1     Mar. 17, 2011

Related U.S. Application Data

(60) Provisional application No. 61/079,461, filed on Jul. 10, 2008, provisional application No. 61/086,803, filed on Aug. 7, 2008, provisional application No. 61/110,676, filed on Nov. 3, 2008, provisional application No. 61/185,589, filed on Jun. 10, 2009, provisional application No. 61/185,609, filed on Jun. 10, 2009.

(51) Int. Cl.
*G06F 9/45*     (2006.01)

(52) U.S. Cl.
USPC .............................. 717/140; 717/148; 717/153

(58) Field of Classification Search
None
See application file for complete search history.

(56) References Cited

U.S. PATENT DOCUMENTS 6,144,932 A    11/2000  Hachiya
7,353,157 B2   4/2008   Wasynczuk et al.
(Continued)

FOREIGN PATENT DOCUMENTS
WO    2010004474 A2    1/2010

OTHER PUBLICATIONS

Cadambi et al., "A Fast, Inexpensive and Scalable Hardware Acceleration Technique for Functional Simulation", Proceedings of the 39th IEEE ACM Design Automation Conference (DAC 2002), pp. 570-575, New Orleans, USA, Jun. 10-14, 2002.

(Continued)

*Primary Examiner* — Chuck Kendall
(74) *Attorney, Agent, or Firm* — D. Kligler I.P. Services Ltd.

(57) ABSTRACT

A computing method includes accepting a definition of a computing task (68), which includes multiple atomic Processing Elements (PEs—76) having execution dependencies (80). Each execution dependency specifies that a respective first PE is to be executed before a respective second PE. The computing task is compiled for concurrent execution on a multiprocessor device (32), which includes multiple processors (44) that are capable of executing a first number of the PEs simultaneously, by arranging the PEs, without violating the execution dependencies, in an invocation data structure (90) including a second number of execution sequences (98) that is greater than one but does not exceed the first number. The multiprocessor device is invoked to run software code that executes the execution sequences in parallel responsively to the invocation data structure, so as to produce a result of the computing task.

80 Claims, 11 Drawing Sheets

(56) References Cited

U.S. PATENT DOCUMENTS

| | | | |
|---|---|---|---|
| 7,409,656 | B1 | 8/2008 | Ruehl |
| 7,444,276 | B2 | 10/2008 | Watt et al. |
| 7,856,347 | B2 | 12/2010 | Rich et al. |
| 2002/0049956 | A1 | 4/2002 | Bozkus et al. |
| 2005/0091025 | A1 | 4/2005 | Wilson et al. |
| 2006/0242618 | A1 | 10/2006 | Wang et al. |
| 2007/0038987 | A1* | 2/2007 | Ohara et al. ............... 717/151 |
| 2007/0073528 | A1 | 3/2007 | Watt et al. |
| 2007/0073999 | A1 | 3/2007 | Verheyen et al. |
| 2007/0074000 | A1 | 3/2007 | Colwill et al. |
| 2007/0129924 | A1 | 6/2007 | Verheyen et al. |
| 2007/0129926 | A1 | 6/2007 | Verheyen et al. |
| 2007/0150702 | A1 | 6/2007 | Verheyen et al. |
| 2007/0206611 | A1 | 9/2007 | Shokri et al. |
| 2007/0219771 | A1 | 9/2007 | Verheyen et al. |
| 2007/0250800 | A1 | 10/2007 | Keswick |
| 2008/0114937 | A1 | 5/2008 | Reid et al. |
| 2008/0208553 | A1 | 8/2008 | Borah et al. |
| 2009/0150136 | A1 | 6/2009 | Yang |
| 2010/0274549 | A1 | 10/2010 | Tal et al. |
| 2010/0332202 | A1 | 12/2010 | Nakhia et al. |
| 2011/0184713 | A1 | 7/2011 | Yang |

OTHER PUBLICATIONS

Karypis et al., "Multilevel Hypergraph Partitioning: Applications in VLSI Domain", IEEE Transaction on Very Large Scale Integration (VLSI) Systems, vol. 7, No. 1, pp. 69-79, USA, Mar. 1999.

NVIDIA Corporation, "Technical Brief, NVIDIA GeForce® GTX 200 GPU Architectural Overview, Second-Generation Unified GPU Architecture for Visual Computing", May 2008.

Gigabyte Technology Co., Ltd., "NVIDIA® GeForceTM GTX 285 Graphics Accelerator", User's Manual, 2009.

International Application PCT/IL09/00330 Search Report dated Jul. 14, 2009.

International Application PCT/IB09/52820 Search Report dated Jan. 14, 2010.

Rubinstein, M., "Discrete Approaches to Content-Aware Image and Video Retargeting", M.Sc.Dissertation, The Interdisciplinary Center, Efi Arazi School of Computer Science, Herzlia, Israel, May 21, 2009.

Cadambi et al., "SimPLE: An Inexpensive, Scalable & Fast Hardware Acceleration Technique for Functional Simulation", C&C Research Laboratories, USA, Jun. 18, 2002.

Ezudheen et al., "Parallelizing SystemC Kernel for Fast Hardware Simulation on SMP Machines", 23rd ACM/IEEE/SCS Workshop on Principles of Advanced and Distributed Simulation (PADS 2009), 1087-4097/09, pp. 80-87, Lake Placid, USA, Jun. 22-25, 2009.

Li et al., "Design and Implementation of Parallel Verilog Simulation: PVSim", Proceedings of the 17th International Conference on VLSI Design, pp. 329-334, Mumbai, India, Jan. 5-9, 2004.

Nanjundappa, M., "Accelerating Hardware Simulation on Multi-cores", Master Thesis, Virginia Polytechnic Institute and State University, May 4, 2010.

Flowmaster Group, Flowmaster Announcements 2008.

Todesco et al., "Symphony: A Simulation Backplane for Parallel Mixed-Mode Co-Simulation of VLSI Systems", Proceedings of the 33rd Design Automation Conference, pp. 149-154, Las Vegas, USA, Jun. 3-7, 1996.

U.S. Appl. No. 13/084,574 Office Action dated May 17, 2012.

Ottoni et al., "Automatic Thread Extraction with Decoupled Software Pipelining", 38th Annual IEEE/ACM International Symposium on Microarchitecture (MICRO-38), pp. 105-116, Barcelona, Spain, Nov. 12-16, 2005.

Ottoni et al., "Global Multi-Threaded Instruction Scheduling", 40th Annual IEEE/ACM International Symposium on Microarchitecture (MICRO-2007), pp. 56-67, Chicago, USA, Dec. 1-5, 2007.

Garland et al., "Parallel Computing Experiences with CUDA", IEEE Micro, vol. 28, No. 4, pp. 13-27, Jul. 1, 2008.

Ryoo et al., "Optimization Principles and Application Performance Evaluation of a Multithreaded GPU using CUDA", Proceedings of the 13th ACM SIGPLAN Symposium on Principles and Practice of Parallel Programming (PPoPP'08), pp. 73-82, Salt Lake City, USA, Feb. 20-23, 2008.

European Patent Application # 09794083.7 Extended Search Report dated Nov. 13, 2012.

Chinese Patent Application # 200980126852.2 Office Action dated Aug. 29, 2012.

U.S. Appl. No. 13/084,574 Office Action dated Oct. 11, 2012.

IEEE Standard 1364-2001, "IEEE Standard Verilog® Hardware Description Language", Sep. 28, 2001.

IEEE Standard 1800-2009, "IEEE Standard for System Verilog—Unified Hardware Design, Specification, and Verification Language", Dec. 11, 2009.

U.S. Appl. No. 12/810,310 Office Action dated Jun. 11, 2013.

* cited by examiner

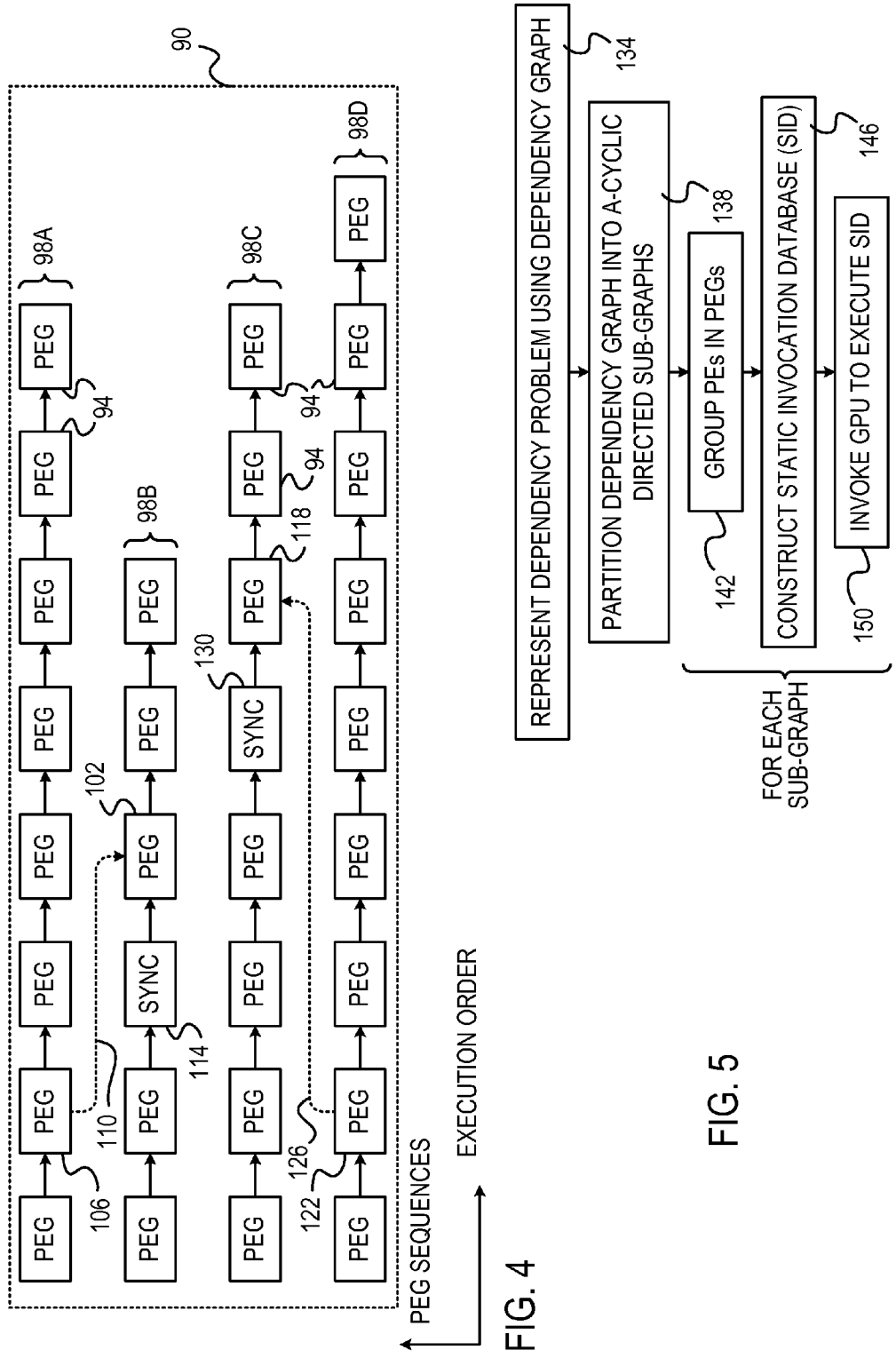

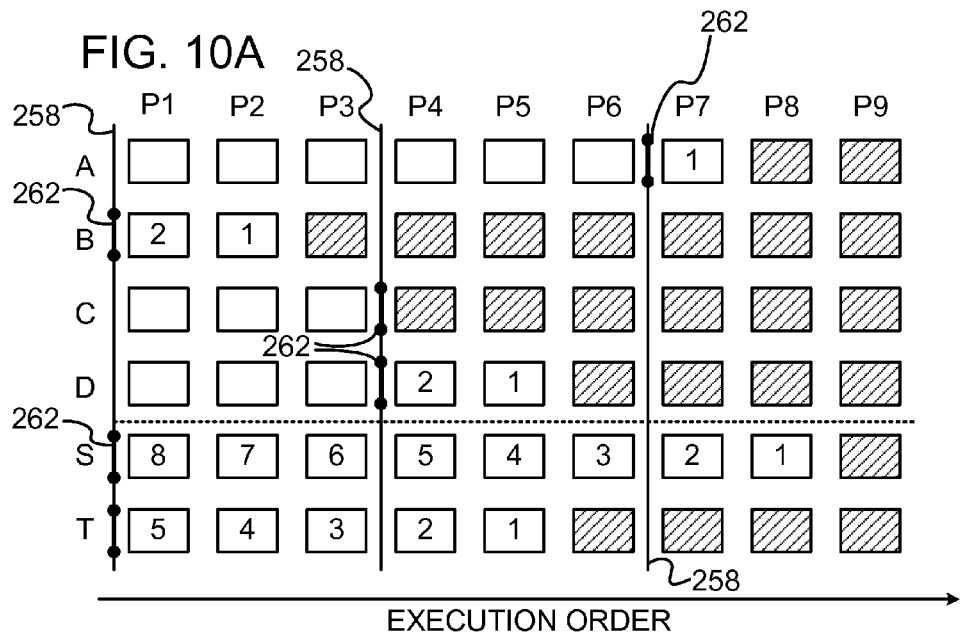
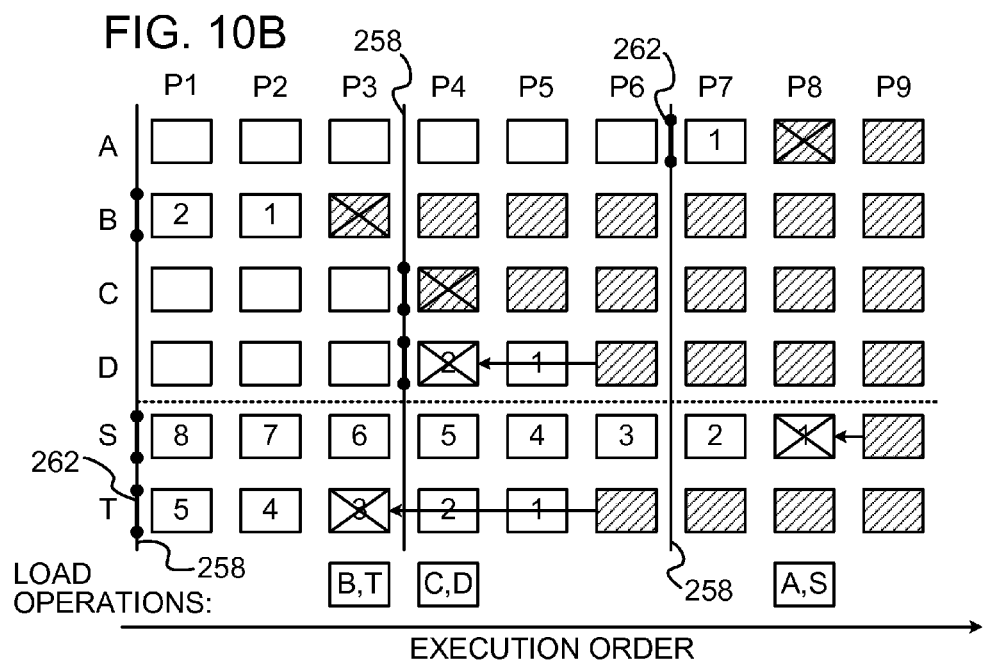

EFFICIENT PARALLEL COMPUTATION OF DEPENDENCY PROBLEMS

CROSS-REFERENCE TO RELATED APPLICATIONS

This application claims the benefit of U.S. Provisional Patent Application 61/079,461, filed Jul. 10, 2008, U.S. Provisional Patent Application 61/086,803, filed Aug. 7, 2008, U.S. Provisional Patent Application 61/110,676, filed Nov. 3, 2008, U.S. Provisional Patent Application 61/185,589, filed Jun. 10, 2009, and U.S. Provisional Patent Application 61/185,609, filed Jun. 10, 2009, whose disclosures are incorporated herein by reference.

FIELD OF THE INVENTION

The present invention relates generally to parallel computing, and particularly to methods and systems for executing dependency problems on parallel processors.

BACKGROUND OF THE INVENTION

Parallel processing techniques are used extensively for executing various kinds of computing tasks. In the field of logic design simulation, for example, Cadambi et al. describe a simulation accelerator based on a Very Long Instruction Word (VLIW) processor in "A Fast, Inexpensive and Scalable Hardware Acceleration Technique for Functional Simulation," Proceedings of the 39$^{th}$ IEEE ACM Design Automation Conference (DAC 2002), New Orleans, La., Jun. 10-14, 2002, pages 570-575, which is incorporated herein by reference. Aspects of logic simulation using VLIW processors are also addressed in U.S. Pat. No. 7,444,276 and in U.S. Patent Application Publications 2007/0219771, 2007/0150702, 2007/0129926, 2007/0129924, 2007/0074000, 2007/0073999 and 2007/0073528, whose disclosures are incorporated herein by reference.

SUMMARY OF THE INVENTION

An embodiment of the present invention provides a computing method, including:

accepting a definition of a computing task, which includes multiple atomic Processing Elements (PEs) having execution dependencies, each execution dependency specifying that a respective first PE is to be executed before a respective second PE;

compiling the computing task for concurrent execution on a multiprocessor device, which includes multiple processors that are capable of executing a first number of the PEs simultaneously, by arranging the PEs, without violating the execution dependencies, in an invocation data structure including a second number of execution sequences that is greater than one but does not exceed the first number; and invoking the multiprocessor device to run software code that executes the execution sequences in parallel responsively to the invocation data structure, so as to produce a result of the computing task.

In some embodiments, the computing task includes a verification task of a design. Alternatively, the computing task may include a signal processing task, an image processing task, a packet processing task and/or an Error Correction Coding (ECC) task. In a disclosed embodiment, the multiprocessor device includes a Graphics Processing Unit (GPU). In another embodiment, the multiprocessor device includes a Digital Signal Processor and/or a multi-core Central Processing Unit (CPU).

In an embodiment, compiling the computing task includes grouping the PEs in each of the execution sequences into PE Groups (PEGs). In another embodiment, the multiprocessor device schedules the PEs for execution by the processors according to a built-in scheduling policy, and invoking the multiprocessor device includes causing the multiprocessor device to execute the second number of the execution sequences in parallel, as arranged in the execution data structure, irrespective of the built-in scheduling policy. In another embodiment, the multiple processors are arranged in groups, each of the groups assigned to execute one or more blocks of threads provided to the multiprocessor device, and invoking the multiprocessor device includes providing each execution sequence as a respective block of threads that is to be executed by the processors within one of the groups. In an embodiment, the processors within each of the groups access a respective shared memory, and compiling the computing task includes causing the PEs in a given execution sequence to exchange data via a shared memory of a group of the processors that is assigned to execute the given execution sequence.

In yet another embodiment, arranging the PEs in the invocation data structure includes minimizing a length of a longest execution sequence, while not exceeding the first number and without violating the execution dependencies. In still another embodiment, a given execution dependency specifies that a driving PE is to be executed before a driven PE, and arranging the PEs in the invocation data structure includes placing the driven PE subsequent to the driving PE in a given execution sequence. In another embodiment, a given execution dependency specifies that a driving PE is to be executed before a driven PE, and arranging the PEs in the invocation data structure includes placing the driving PE in a first execution sequence, placing the driven PE in a second execution sequence, different from the first execution sequence, and inserting into the second execution sequence a synchronization element that halts execution of the second execution sequence until the given driving PE is fully executed.

In some embodiments, compiling the computing task includes extracting from the computing task multiple a-cyclic sub-graphs, and compiling the multiple sub-graphs to produce respective multiple invocation data structures. In a disclosed embodiment, arranging the PEs in the invocation data structure includes defining an order in which the PEs are to be selected for placement in the execution sequences, and populating the execution sequences with the PEs in accordance with the order.

In an embodiment, defining the order includes, for each PE:

determining a first length of a longest chain of the execution dependencies that leads to the PE;

determining a second length of a longest chain of the execution dependencies that begins at the given PE;

determining, based on the first and second lengths, an allocation interval including possible positions of the PE along the execution sequences; and ordering the PEs in ascending order of respective lengths of the allocation intervals.

Populating the execution sequences may include placing each PE within the respective allocation interval in one of the execution sequences.

In another embodiment, defining the order includes:

identifying output groups, each output group including two or more PEs that drive a respective driven PE;

identifying input groups, each input group including at least two PEs that are driven by a respective driving PE;

assigning each PE a respective group score based on a number of output and input groups that contain the PE; and defining the order based on the group scores of the PEs.

In yet another embodiment, arranging the PEs in the invocation data structure includes, for a given PE and for a set of potential positions within the execution sequences, computing respective allocation costs that would be incurred by placing the given PE at the potential positions, and placing the given PE at one of the potential position having a lowest allocation cost.

In an embodiment, computing the allocation costs includes evaluating an allocation cost of a given potential position within a given execution sequence responsively to an increase in execution time of the invocation data structure that would be caused by placing the given PE in the given potential position, a first number of the PEs in the given execution sequence that share a common driving PE with the given PE, a second number of the PEs in the given execution sequence that share a common driven PE with the given PE, a third number of the PEs in the given execution sequence that share a common execution dependency with the given PE, and/or a distance from an optimal position computed for the given PE. In an embodiment, arranging the PEs in the invocation data structure includes arranging the PEs within each execution sequence in warps, each warp including one or more PEs of a given type.

In some embodiments, compiling the computing task includes, for a given execution sequence, defining a deterministic caching pattern of fetching variables from a device memory of the multiprocessor device into a cache memory and discarding at least some of the variables from the cache memory during execution of the given execution sequence, and causing the multiprocessor device to carry out the deterministic caching pattern when executing the given execution sequence. In an embodiment, the PEs in the given execution sequence are grouped into PE Groups (PEG), and defining the caching pattern includes:

for each variable that is present in the cache memory during execution of a given PEG, identifying a respective next PEG in the given execution sequence that will use the variable;

upon a need to discard one or more of the variables from the cache memory following execution of the given PEG, selecting one of the variables whose respective next PEG has a largest distance from the given PEG along the given execution sequence; and defining in the caching pattern that the selected variable is to be discarded following the execution of the given PEG.

In another embodiment, defining the caching pattern includes combining fetching of two or more variables in a single fetch command. In yet another embodiment, combining the fetching includes defining, for each variable, a fetching interval along the given execution sequence that begins when the variable becomes valid and ends when the variable is first used, defining the single fetch command to contain at least two variables whose respective fetching intervals have an overlap, and positioning the single fetch command to occur during the overlap. Combining the fetching may include selecting a given variable to be combined into the single fetch command by identifying the given variable having a smallest distance between a position of the single fetch command and a time at which the given variable is first used.

In a disclosed embodiment, defining the caching pattern includes combining storage of two or more variables in a single store command. In an embodiment, the deterministic caching pattern of the given execution sequence fetches the variables from the device memory at a given order, and compiling the computing task includes pre-ordering the variables in the device memory in successive addresses according to the given order. In some embodiments, compiling the computing task includes causing a first execution sequence to provide one or more variables as input to a second execution sequence by accessing a device memory of the multiprocessor device.

In some embodiments, compiling the computing task includes producing multiple invocation data structures, each including one or more execution sequences, and causing at least some of the execution sequences to exchange variables between different invocation data structures by accessing a device memory of the multiprocessor device. In an embodiment, each of the variables exchanged between the different invocation data structures is produced by one or more source execution sequences and used by one or more target sequences, and compiling the computing task includes aggregating the variables into groups according to the source and target execution sequences, and storing each of the groups in consecutive addresses in the device memory. In a disclosed embodiment, causing the execution sequences to exchange the variables includes causing the execution sequences to read the variables from the device memory in read commands, each read command reading data of a predefined size from one of the groups. In an embodiment, when the variables in two or more of the groups jointly do not exceed the predefined size, the method includes defining a combined read command that reads the variables from the two or more of the groups.

In an embodiment, when a set of multiple execution sequences in a given invocation data structure use a group of the variables, the method includes causing only a partial subset of the multiple execution sequences to read the group of the variables from the device memory and to transfer the variables to the other execution sequences in the set. Causing the partial subset of the execution sequences to transfer the variables may include identifying at least one execution sequence in the set that is unable to receive the variables from other execution sequences in the invocation data structure, and adding the identified sequence to the partial subset. Causing the partial subset of the execution sequences to transfer the variables may include identifying synchronization elements in the given invocation data structure, which connect the partial subset to the other execution sequences in the set, and allocating communication resources associated with the synchronization elements for transferring the variables.

In some embodiments, compiling the computing task and invoking the multiprocessor device include running an event-driven simulation that simulates the computing task. In an embodiment, arranging the PEs in the invocation data structure includes placing the PEs in the execution sequences in accordance with lengths of respective longest chains of the execution dependencies that begin at the PEs, respective occupancy levels of the execution sequences, and/or synchronization elements that are incurred by placement of the PEs.

There is additionally provided, in accordance with an embodiment of the present invention, a computing method, including:

accepting a definition of a computing task, which includes multiple atomic Processing Elements (PEs) having execution dependencies, each execution dependency specifying that a respective first PE is to be executed before a respective second PE;

compiling the computing task for concurrent execution on a multiprocessor device, which includes multiple processors operating in parallel and schedules the PEs for execution by the processors according to a built-in scheduling policy of the microprocessor device, by arranging the PEs, without violating the execution dependencies, in an invocation data structure including multiple execution sequences; and invoking the multiprocessor device to run software code that executes the execution sequences in parallel responsively to the invocation data structure and irrespective of the scheduling policy of the multiprocessor device, so as to produce a result of the computing task.

There is also provided, in accordance with an embodiment of the present invention, a computing apparatus, including:

an interface, which is coupled to accept a definition of a computing task, which includes multiple atomic Processing Elements (PEs) having execution dependencies, each execution dependency specifying that a respective first PE is to be executed before a respective second PE; and a Central Processing Unit (CPU), which is arranged to compile the computing task for concurrent execution on a multiprocessor device, which includes multiple processors that are capable of executing a first number of the PEs simultaneously, by arranging the PEs, without violating the execution dependencies, in an invocation data structure including a second number of execution sequences that is greater than one but does not exceed the first number, and to invoke the multiprocessor device to run software code that executes the execution sequences in parallel responsively to the invocation data structure so as to produce a result of the computing task.

There is further provided, in accordance with an embodiment of the present invention, a computing apparatus, including:

an interface, which is coupled to accept a definition of a computing task, which includes multiple atomic Processing Elements (PEs) having execution dependencies, each execution dependency specifying that a respective first PE is to be executed before a respective second PE; and a Central Processing Unit (CPU), which is arranged to compile the computing task for concurrent execution on a multiprocessor device, which includes multiple processors operating in parallel and schedules the PEs for execution by the processors according to a built-in scheduling policy of the microprocessor device, by arranging the PEs, without violating the execution dependencies, in an invocation data structure including multiple execution sequences, and to invoke the multiprocessor device to run software code that executes the execution sequences in parallel responsively to the invocation data structure and irrespective of the scheduling policy of the multiprocessor device so as to produce a result of the computing task.

There is also provided, in accordance with an embodiment of the present invention, a computing apparatus, including:

a multiprocessor device, which includes multiple processors that are capable of executing a first number of atomic Processing Elements (PEs) simultaneously; and a Central Processing Unit (CPU), which is arranged to accept a definition of a computing task, which includes multiple PEs having execution dependencies, each execution dependency specifying that a respective first PE is to be executed before a respective second PE, to compile the computing task for concurrent execution on the multiprocessor device by arranging the PEs, without violating the execution dependencies, in an invocation data structure including a second number of execution sequences that is greater than one but does not exceed the first number, and to invoke the multiprocessor device to run software code that executes the execution sequences in parallel responsively to the invocation data structure so as to produce a result of the computing task.

There is additionally provided, in accordance with an embodiment of the present invention, a computing apparatus, including:

a multiprocessor device, which includes multiple processors operating in parallel and schedules atomic Processing Elements (PEs) for execution by the processors according to a built-in scheduling policy of the microprocessor device; and a Central Processing Unit (CPU), which is arranged to accept a definition of a computing task, which includes multiple PEs having execution dependencies, each execution dependency specifying that a respective first PE is to be executed before a respective second PE, to compile the computing task for concurrent execution on the multiprocessor device by arranging the PEs, without violating the execution dependencies, in an invocation data structure including multiple execution sequences, and to invoke the multiprocessor device to run software code that executes the execution sequences in parallel responsively to the invocation data structure and irrespective of the scheduling policy of the multiprocessor device so as to produce a result of the computing task.

There is further provided, in accordance with an embodiment of the present invention, a computer software product, the product including a computer-readable medium, in which program instructions are stored, which instructions, when read by a computer, cause the computer to accept a definition of a computing task, which includes multiple atomic Processing Elements (PEs) having execution dependencies, each execution dependency specifying that a respective first PE is to be executed before a respective second PE, to compile the computing task for concurrent execution on a multiprocessor device, which includes multiple processors that are capable of executing a first number of the PEs simultaneously, by arranging the PEs, without violating the execution dependencies, in an invocation data structure including a second number of execution sequences that is greater than one but does not exceed the first number, and to invoke the multiprocessor device to run software code that executes the execution sequences in parallel responsively to the invocation data structure so as to produce a result of the computing task.

There is also provided, in accordance with an embodiment of the present invention, a computer software product, the product including a computer-readable medium, in which program instructions are stored, which instructions, when read by a computer, cause the computer to accept a definition of a computing task, which includes multiple atomic Processing Elements (PEs) having execution dependencies, each execution dependency specifying that a respective first PE is to be executed before a respective second PE, to compile the computing task for concurrent execution on a multiprocessor device, which includes multiple processors operating in parallel and schedules the PEs for execution by the processors according to a built-in scheduling policy of the microprocessor device, by arranging the PEs, without violating the execution dependencies, in an invocation data structure including multiple execution sequences, and to invoke the multiprocessor device to run software code that executes the execution sequences in parallel responsively to the invocation data structure and irrespective of the scheduling policy of the multiprocessor device so as to produce a result of the computing task.

The present invention will be more fully understood from the following detailed description of the embodiments thereof, taken together with the drawings in which:

BRIEF DESCRIPTION OF THE DRAWINGS

FIG. 4 is a diagram that schematically illustrates a Static Invocation Database (SID), in accordance with an embodiment of the present invention;

FIG. 5 is a flow chart that schematically illustrates a method for executing a dependency problem, in accordance with an embodiment of the present invention;

FIGS. 10A and 10B are diagrams that schematically illustrate a variable pre-fetching scheme, in accordance with an embodiment of the present invention;

DETAILED DESCRIPTION OF EMBODIMENTS

Overview

Figure 1:
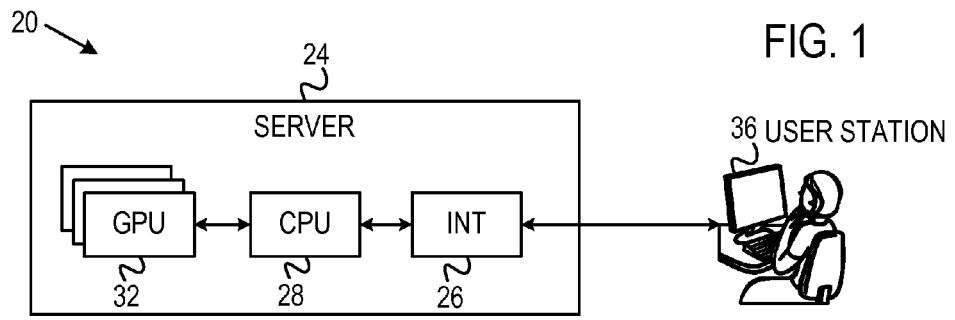
FIG. 1 is a block diagram that schematically illustrates a system for executing dependency problems, in accordance with an embodiment of the present invention.

Various types of computational tasks in a wide range of fields can be represented as dependency problems, i.e., as a set of atomic processing elements having execution dependencies. Dependency problems are often large and complex, and their execution often involves high computational complexity and execution time. Therefore, it is advantageous to execute dependency problems on multiple processors that operate in parallel. The execution dependencies between processing elements, however, often make dependency problems difficult to partition into parallel computing tasks.

Embodiments of the present invention provide improved methods and systems for executing dependency problems by parallel processors. The disclosed methods and systems operate on a dependency problem, which comprises atomic Processing Elements (PEs) having execution dependencies. (An execution dependency between a pair of processing elements means that one processing element operates on input that is produced by another processing element. As such, execution dependencies impose constraints on the order of execution of the processing elements.) The dependency problem is compiled for concurrent execution on a multiprocessor device comprising multiple processors, such as a Graphics Processing Unit (GPU).

The compilation process arranges the PEs, without violating the execution dependencies, in multiple execution sequences that are executed in parallel by the processing cores of the multiprocessor device. Typically, the compilation process generates a Static Invocation Database (SID) comprising the execution sequences. The multiprocessor device is invoked to run software code that executes the SID, so as to produce a result of the dependency problem.

The execution dependencies are preserved by attempting to place interdependent PEs in the same execution sequence, and introducing synchronization between PEs in different sequences if needed. In a typical multiprocessor device, the processors are arranged in groups, and the processors in each group are able to interact and exchange data via a shared memory. In some embodiments, each execution sequence in the SID is provided to the multiprocessor device as a block of threads, so as to guarantee that the PEs in each sequence are executed by the same group of processors and can exchange data via the group's shared memory.

The number of execution sequences in the SID is selected so as not to exceed the maximum number of thread blocks that the multiprocessor device is capable of executing simultaneously. As a result, the execution sequences are guaranteed to run simultaneously, and are generally unaffected by any built-in scheduling policy of the multiprocessor device. This mode of operation is in sharp contrast to known invocation schemes, which usually flood the multiprocessor device with a large number of thread blocks and rely on the multiprocessor device's internal scheduling to achieve parallelization. In the methods and systems described herein, on the other hand, parallelization of the dependency problem among the multiple parallel processors is fully deterministic and is defined at compilation time rather than at runtime. Thus, the internal scheduling policy of the multiprocessor device is effectively bypassed, and the execution order of the PEs is fully controlled by the execution sequences and synchronization mechanisms defined in the SID. An example process that generates highly-efficient SIDs is described herein.

In addition, several methods and systems for managing the large number of memory access operations carried out during SID execution are described herein. In particular, the disclosed techniques make efficient use of the multiprocessor device's device memory and shared memories by the PE execution sequences. (In a typical multiprocessor device, the device memory offers large memory space, but incurs high access latency, is accessed at a large granularity and imposes address alignment constraints. The shared memories, on the other hand, have limited memory space, but offer fast access times and little or no alignment constraints.) The disclosed techniques achieve efficient and deterministic memory access, by using the fact that the pattern of memory access operations is fully determined during SID compilation.

System Description

FIG. 1 is a block diagram that schematically illustrates a system 20 for executing dependency problems, in accordance with an embodiment of the present invention. Various kinds of computing tasks can be represented as dependency problems, i.e., as a set of atomic processing tasks having execution dependencies. Dependency problems can be found in a wide range of fields and applications, such as, for example, digital hardware design simulation, real-time video processing, image processing, Software-Defined Radio (SDR), packet processing in various communication applications and error correction coding. System 20 can be used for efficient execution of any suitable computing task that can be represented as a dependency problem. Several examples of specific computing tasks, and the applicability of the disclosed techniques to these tasks, are described further below.

In the present example, system 20 comprises a server 24, which comprises an interface 26, a Central Processing Unit 28 and one or more Graphics Processing Units (GPUs) 32. Server 24 may comprise any suitable workstation or computing platform. Each GPU, as will be described below, comprises a large number of processing cores that operate in parallel. The methods and systems described herein produce software code that maximizes the parallel utilization of the GPU cores, and therefore enables system 20 to execute highly complex dependency problems with relatively short execution times.

Server 24 interacts with a user via a user station 36. Server 24 accepts from the user, via interface 26, a dependency problem to be executed. The server compiles the input dependency problem to produce software code, and then runs the code on CPU 28 and GPUs 32. Execution results are provided to the user via interface 26. The functionality of system 20 can be partitioned between CPU 28 and GPUs 32 in various ways, depending on the application. The embodiments described herein refer to a single GPU. In general, however, any desired number of GPUs can be used.

Typically, CPU 28 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The configuration of system 20 is an example configuration, which is chosen purely for the sake of conceptual clarity. Any other suitable system configuration can also be used. For example, user station 36 may communicate with server 24 locally or over a communication network. In alternative embodiments, the user station functionality can be implemented directly on server 24.

Some aspects of using a system such as system 20 for logic design simulation are addressed in PCT Application PCT/IL2009/000330, entitled "Design Simulation using Parallel Processors," filed Mar. 25, 2009, which is assigned to the assignee of the present patent application and whose disclosure is incorporated herein by reference.

Figure 2:
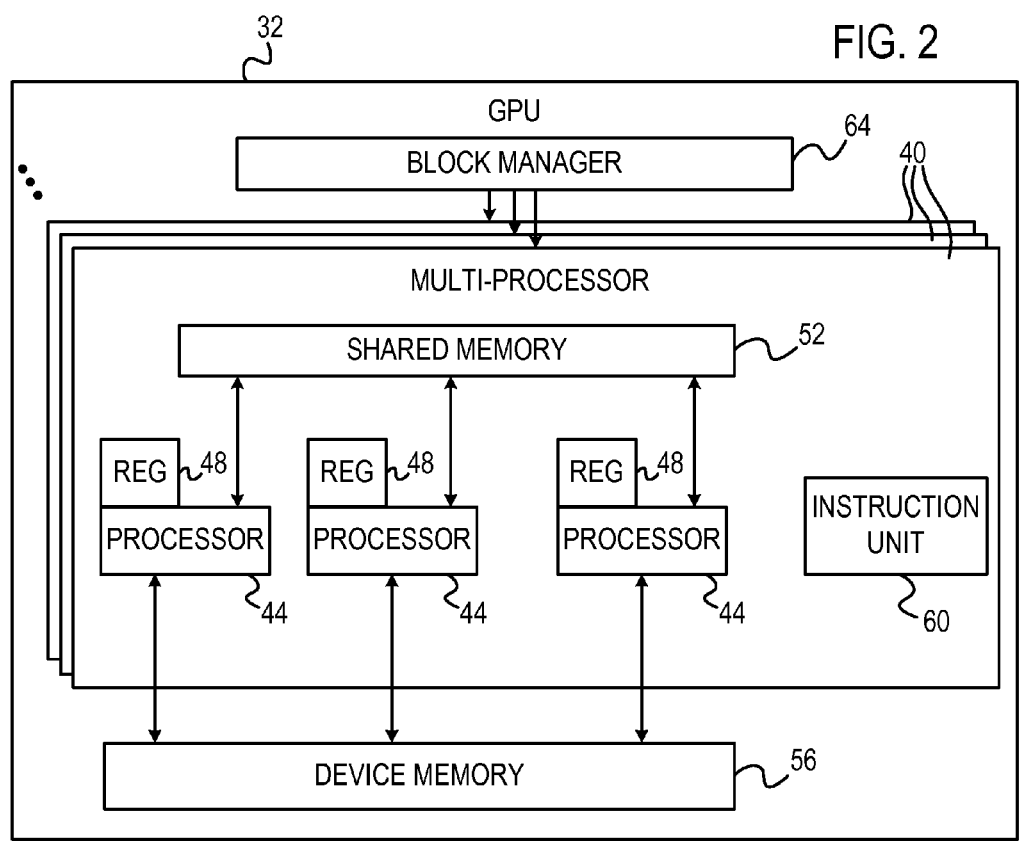
FIG. 2 is a block diagram that schematically illustrates a Graphics Processing Unit (GPU), in accordance with an embodiment of the present invention.

FIG. 2 is a block diagram that schematically illustrates the internal structure of GPU 32, in accordance with an embodiment of the present invention. In the present example, GPU 32 comprises multiple multi-processors 40. Each multi-processor 40 comprises multiple processors 44, which are also referred to herein as processing cores. In some embodiments, each multi-processor 40 comprises a Single Instruction Multiple Thread (SIMT) processor, as is known in the art. In alternative embodiments, each multi-processor 40 comprises a Single Instruction Multiple Data (SIMD) processor, in which all processors 44 run the same instruction in each clock cycle. (Different processors may, however, run the same instruction over different data.) In a typical application, all processors 44 in the entire GPU run the same instruction. The differentiation between functions of different processors is introduced by the data. The disclosed techniques are applicable to both SIMD and SIMT processors.

Each processor 44 can access a number of local registers 48. The different processors within a given multi-processor 40 can store data in a shared memory 52. This shared memory is accessible to processors 44 of the given multi-processor but not to processors of other multi-processors. In a typical GPU, each multi-processor also comprises an instruction unit 60, which manages the operation of the multi-processor. In a typical multi-processor, unit 60 creates, manages and executes concurrent threads. In particular, unit 60 may comprise hardware mechanisms that synchronize the operation of different threads running in the multi-processor.

GPU 32 further comprises a device memory 56, which is also referred to herein as an external memory. Memory 56 typically comprises a Dynamic Random Access memory (DRAM). Unlike shared memory 52, device memory 56 is typically accessible to the processors of all multi-processors 40. On the other hand, access to device memory 56 is typically expensive in terms of latency and throughput. In order to access memory 56 efficiently, it is typically desirable to write into or read from consecutive and aligned memory addresses. Some of the methods described herein are concerned with producing code that accesses memory 56 efficiently.

The basic software code unit that each processor 44 runs at any given time is referred to as a thread. Typically, CPU 28 invokes GPU 32 by providing the GPU with blocks of threads. A given block of threads is guaranteed to run on the processors of a single multi-processor 40 in SIMD or SNIT mode. Thus, the threads in a given block can communicate with one another via shared memory 52.

Typically, the number of threads per block can be greater than the number of processors in the multi-processor. The number of blocks provided to the GPU can generally be greater than the number of multi-processors. The GPU comprises a block manager 60, which accepts blocks for execution from CPU 28 and schedules the execution of blocks and threads according to certain internal criteria. These criteria are referred to herein as a built-in scheduling policy.

Thus, other than the guarantee that the threads of a given block are executed in the same multi-processor, there is no guarantee as to the order in which the threads of a given block are executed in the multi-processor. There is also no guarantee as to the order in which different blocks are executed in the GPU. In other words, CPU 28 generally has no control over the internal scheduling policy of the GPU.

Some of the methods and systems described herein produce code, which makes use of the architectural features of the GPU, such as the ability to synchronize and share data among threads in a given block. When partitioning the dependency problem into threads, the disclosed methods and systems preserve the inherent dependencies between different atomic processing tasks, given the non-guaranteed nature of thread and block execution in the GPU (i.e., irrespective of the scheduling policy of the GPU).

In particular, the GPU is typically specified to execute a certain number of blocks simultaneously. If the GPU is invoked with a larger number of blocks, the blocks are scheduled by block manager 60. Some of the methods and systems described herein invoke the GPU with a number of blocks that does not exceed the maximum number of blocks that can be executed simultaneously. As a result, the internal scheduling policy of block manager 60 is effectively bypassed. These features are explained in detail further below.

The GPU configuration of FIG. 2 is an example configuration, which is chosen purely for the sake of conceptual clarity. In alternative embodiments, any other suitable GPU configuration can also be used. A typical GPU device that can be used for this purpose is the GTX285 device, produced by NVIDIA Corp. (Santa Clara, Calif.). This device comprises thirty multi-processors, each comprising eight processing cores. Further alternatively, although the embodiments described herein refer to the use of a GPU, the disclosed methods and systems can be used with various other types of processors that operate multiple processing cores in parallel, such as Digital Signal Processors (DSPs) and multi-core Central Processing Units (CPUs).

Representing Dependency Problems Using Dependency Graphs

CPU 28 represents an input dependency problem in terms of atomic execution tasks, which are referred to herein as Processing Elements (PEs). When the dependency problem is executed by GPU 32, each PE corresponds to a thread that is executed by a certain processor 44. The CPU typically holds a library of PE types, each type performing a certain atomic task (e.g., look-up table lookups, flip-flops, buffering operations, memory access operations, multiplexing operations, arithmetic operations, logical operations or any other suitable task types). Each PE belongs to one of the types, and operates on certain data.

When processors 44 operate in SIMT mode, each thread typically comprises code that is able to run the different PE types. When the thread is executed, the actual PE type executed by the thread is selected by the data. The data read by the thread can select the actual PE type, for example, by jumping to a program address that carries out the desired PE functionality, or using any other suitable selection means. A typical thread may thus execute the following flow:

Read the desired PE type from memory 56, and jump to the appropriate address that implements this PE type.
Read the PE parameters and input values from memory 56.
Execute the desired PE functionality.
Write the PE output values to memory 56.

(In order to access memory 56 efficiently, CPU 28 may divide the PEs into PE Groups—PEGs. This feature is addressed in detail further below, and also in PCT Application PCT/IL2009/000330, cited above.) Typically, the thread load and store operations are not linked with the PE parameters of the thread. For example, a given PEG may support up to sixty-four load commands from the device memory to the shared memory. A given thread may load data that is not used by its PEs.

When using the above-mentioned technique in a SIMT processor, it is generally desirable that threads that are scheduled to run concurrently in a given multi-processor SIMT unit will run the same PE types, so that the unit will run effectively in SIMD mode.

Figure 3:
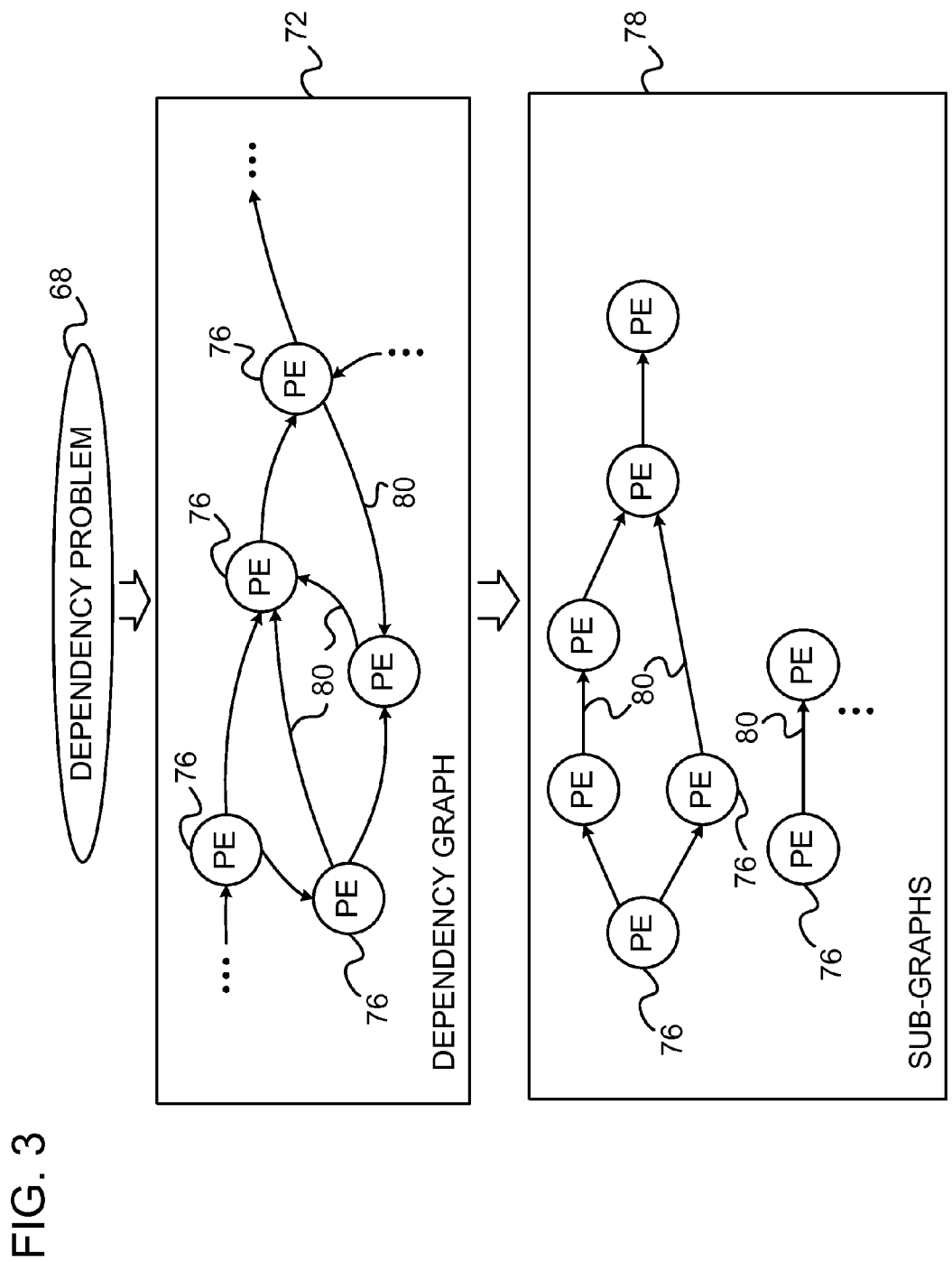
FIG. 3 is a diagram that schematically illustrates a dependency problem represented by dependency graphs, in accordance with an embodiment of the present invention.

FIG. 3 is a diagram that schematically illustrates a dependency problem represented by a dependency graph, in accordance with an embodiment of the present invention. CPU 28 represents the dependency problem using multiple PEs, which are interconnected by execution dependencies. A given dependency specifies that the output of a certain PE (referred to as the "driving" PE) is to be used as input to another PE (referred to as the "driven" PE). In other words, the driven PE depends on the driving PE. Such a dependency means that the driving PE is to be executed before the driven PE, since otherwise the input of the driven PE will not be valid.

FIG. 3 shows an example dependency problem 68, which is converted into a dependency graph 72. Graph 72 comprises multiple vertices 76 that represent the PEs, and directed edges 80 that represent the execution dependencies. A given edge is directed from the driving PE to the driven PE. In some embodiments, CPU 28 produces multiple sub-graphs 78 from dependency graph 72. Unlike dependency graph 72, which may generally be cyclic, each sub-graph 78 is a-cyclic.

The methods described below convert a give a-cyclic sub-graph into code that is executed on GPU 32. If the dependency problem is represented using multiple sub-graphs, the disclosed methods are typically applied to each sub-graph separately. In some embodiments, commonalities between variables among different sub-graphs can be exploited to increase computational efficiency. These features are addressed further below.

Representing and Executing Dependency Graphs Using Static Invocation Database (Sid)

In some embodiments, CPU 28 compiles the input dependency problem to produce an invocation data structure, which is referred to herein as a Static Invocation Database (SID). The SID is provided to GPU 32 for execution. CPU 28 typically runs a compiler program that produces the SID. In the description that follows, actions performed by CPU 28 are sometimes referred to as being carried out by the compiler, for the sake of clarity. In alternative embodiments, however, the compiler may run on any suitable processor so as to produce the SID. The resulting SID can then be provided to system 20 for execution.

The SID comprises a set of PE execution sequences, which are guaranteed to run in parallel to one another and at a particular order, irrespective of the internal scheduling policy of the GPU. When the GPU is invoked with the SID, each execution sequence is provided to the GPU as a block of threads. Thus, the PEs within each sequence are guaranteed to run in the same multiprocessor 40 of GPU 32. Additionally, the number of execution sequences in the SID does not exceed the maximum number of blocks that can be executed simultaneously by the GPU. As a result, the execution sequences are guaranteed to run simultaneously in the GPU, and are generally unaffected by the internal scheduling policies of block manager 60. In other words, the internal scheduling policy of the GPU is effectively bypassed, and the execution order of the PEs is fully controlled by the SID.

FIG. 4 is a diagram that schematically illustrates a SID 90, in accordance with an embodiment of the present invention. SID 90 comprises a set of execution sequences, in the present example four sequences 98A . . . 98D. Generally, however, any suitable number of sequences, which is greater than one but does not exceed the maximum number of blocks that can be executed simultaneously by the GPU, can be used. Each execution sequence comprises a series of PEGs 94, which are executed one following the other. (Grouping of PEs into PEGs is addressed further below.)

The number of blocks that the GPU can run simultaneously is typically given by the number of multiprocessors 40 multiplied by the number of blocks that can be executed simultaneously by each multiprocessor. The actual number of concurrent blocks per multiprocessor may sometimes be limited by multiprocessor resources (e.g., registers, shared memory or thread count), and thus it may be smaller than the specified number of concurrent blocks per multiprocessor.

In some cases, the actual number of concurrent blocks per multiprocessor can be written as min((multiprocessor_register_count/program_reg_count), (multiprocessor_shared_memory_size/program_shared_memory), (number of threads per multiprocessor/number of threads per block), specified number of concurrent blocks per multiprocessor). The GTX285 GPU, for example, has 30 multiprocessors 40. Each multiprocessor comprises 16,384 registers and a 16 Kbyte shared memory, and support up to 1,024 concurrent threads and up to eight concurrent blocks. In an example embodiment, the GPU code produced by the compiler uses 2 KB of shared memory and fifteen registers per thread, wherein each block comprises sixty-four threads. This code results in a total of 15×64=240 registers per block. In this example, the number of concurrent blocks per multiprocessor is min(16 KB/2 KB, 16384/240, 1024/64, 8)=min(8, 68, 16, 8)=8. The maximum number of concurrent blocks that can be executed simultaneously by the entire GPU is thus 8×30=240.

Different execution sequences may generally have different lengths, i.e., different execution times. Typically, CPU 28 attempts to compile the dependency problem into a SID whose execution time is minimal. In other words, the CPU attempts to produce a SID having the shortest execution sequences, without exceeding the maximum permitted number of sequences. An example SID generation process of this sort is described in detail further below.

Since each execution sequence comprises a block of threads that are guaranteed to run in the same multiprocessor 40, the PEGs within a given sequence are guaranteed to run in the correct order. Thus, placing a driving PE before its respective driven PE in the same execution sequence would guarantee that the execution dependency between the PEs will not be violated. Moreover, PEGs belonging to the same execution sequence may exchange data using shared memory 52 of the multiprocessor that runs this sequence.

In many dependency problems, however, the constraint of placing every pair of dependent PEs in the same execution sequence is too severe. Such a constraint often produces a small number of extremely long execution sequences, and therefore increases execution time and limits the achievable parallelization. In many cases, it is desirable to place dependent PEs in different execution sequences while still preserving the execution dependencies.

In some embodiments, the compiler forces synchronization between different execution sequences in the SID, in order to preserve the dependencies between PEs that are placed in different sequences. In FIG. 4, for example, a PEG 102 in sequence 98B depends on a PEG 106 in sequence 98A, as indicated by a dependency 110. (More accurately, PEG 102 contains a PE that depends on a PE in PEG 106.) In order to ensure that PEG 106 executes completely before PEG 102 begins execution, the compiler places a synchronization element, e.g., a SYNC PEG 114, in sequence 98B before PEG 102. SYNC 114 halts the execution of sequence 98B until PEG 106 completes execution and produces valid output. The output of PEG 106 is then provided as input to PEG 102, and sequence 98B may resume execution. Similarly, a PEG 118 in sequence 98C depends on a PEG 122 in sequence 98D, as indicated by a dependency 126. In order to preserve this dependency, the compiler places a SYNC PEG 130 in sequence 98C before PEG 118.

Synchronization between sequences is typically implemented using device memory 56. For example, a driving PEG may signal its execution status by writing to a certain region in device memory 56. A SYNC PEG may poll this region and resume execution of its sequence only when the driving PEG has completed execution.

Note, however, that not every pair of dependent PEs in different sequences necessarily requires addition of a SYNC PEG. Assume, for example, that the last PEG in sequence 98C depends on the first PEG in sequence 98D. In this case, it is not necessary to add another SYNC PEG to sequence 98C, since the existing SYNC PEG 130 already ensures that the last PEG in sequence 98C will not execute unless the first PEG in sequence 98D completed execution.

Generally, a certain SYNC PEG may depend on any desired number of PEGs in any desired number of sequences, i.e., halt execution of a given sequence until a predefined set of driving PEGs have completed execution. In some embodiments, the synchronization functionality may be embedded in the driven PEGs without using dedicated SYNC PEGs.

Forcing synchronization between sequences can be highly-effective in balancing the execution times of different sequences, and thus increasing parallelization. On the other hand, the synchronization mechanism introduces latency and involves costly access to device memory 56. As will be explained below, the compiler typically attempts to trade-off these advantages and penalties in order to achieve the lowest overall execution time of the SID.

FIG. 5 is a flow chart that schematically illustrates a method for executing a dependency problem, in accordance with an embodiment of the present invention. The method begins with CPU 28 receiving an input dependency problem, which is represented as a dependency graph, at a graph input step 134. The CPU partitions the dependency graph into directed, a-cyclic sub-graphs, at a partitioning step 138. Partitioning of a dependency graph into directed, a-cyclic sub-graphs is addressed, for example, in PCT Application PCT/IL2009/000330, cited above. For each sub-graph, the CPU groups the PEs into PEGs, at a grouping step 142, and arranges the PEGS in a SID, at a SID construction step 146. The CPU invokes GPU 32 to execute the SID, at an invocation step 150. The GPU executes the PEG sequences in the SID, so as to produce a result of the computing task.

Efficient Sid Generation

As noted above, the compiler running on CPU 28 typically attempts to produce a SID having the shortest execution time for a given maximum number of execution sequences. The input to such a process is a directed, a-cyclic dependency sub-graph of PEs, which is to be converted to a SID. In some embodiments, the compiler generates the SID by gradually filling a two-dimensional grid of warps with PEs, in a manner that preserves the execution dependencies between the PEs.

A warp is a group of threads of the same type, which run concurrently and efficiently in a given multiprocessor. The maximum number of threads (and thus PEs) in a warp may vary from one GPU type to another. In the NVIDIA GTX285 device, for example, each warp runs thirty-two threads. As will be shown below, several warps can later be joined to form a PEG.

Figure 6:
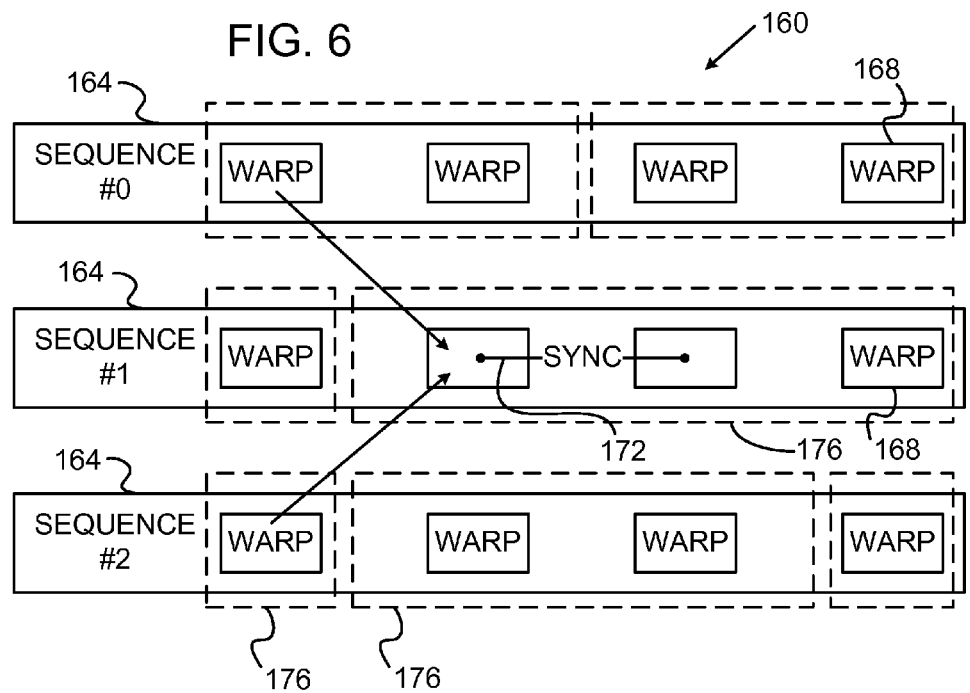
FIG. 6 is a diagram that schematically illustrates a grid of warps used in SID generation, in accordance with an embodiment of the present invention.

FIG. 6 is a diagram that schematically illustrates a warp grid 160 used for SID generation, in accordance with an embodiment of the present invention. Grid 160 comprises multiple execution sequences 164, each comprising multiple warp slots 168. The warp slots are initially empty, and the compiler gradually fills them with PEs. In order to force synchronization between different execution sequences, the compiler sometimes inserts SYNC warps 172 into the sequences. (Note that the SYNC warps differ from ordinary warps in that they do not contain threads for execution. The SYNC warps imitate the latency of a SYNC operation that will be inserted into the sequence.) At the end of the process, each PE in the input sub-graph is placed in one of the warp slots (each warp slot may contain multiple PEs of the same type). The compiler then forms PEGs 176 from the warps, in some cases joining two or more adjacent warps in a given sequence to form a PEG. The grid of PEGs is output as the desired SID.

Typically, the number of execution sequences 164 in grid 160 is set so as not to exceed the maximum number of thread blocks that the GPU can run simultaneously, so that execution of the resulting SID will not be affected by internal GPU scheduling. The number of warp slots per sequence is typically initialized as the length of the longest path in the input sub-graph.

Because of the dependencies between PEs, each PE can only be placed in a certain partial subset of the columns of grid 160. This subset is referred to as the allocation interval of the PE. For example, a PE that depends on another PE cannot be placed in the first column of the warp grid (i.e., at the beginning of any execution sequence), since the driving must be executed first. Similarly, a PE that drives another PE cannot be placed in the last column of the grid.

Generally, each PE in the sub-graph has a certain allocation interval, which defines the columns of grid 160 in which the PE can be potentially placed. The allocation interval of a PE x depends on two parameters, which are referred to as the backward phase (denoted $BP(x)$) and the forward phase (denoted $PF(x)$) of PE x. The backward phase of a given PE is defined as the number of PEs along the longest path in the sub-graph that leads to this PE. The forward phase of a given PE is defined as the number of PEs along the longest path in the sub-graph that begins at this PE.

Using this terminology, the length of the longest path in the sub-graph (and therefore the number of columns in warp grid 160) is given by $L=\max(BP(x)+FP(x))+1$, wherein the maximum is taken over all the PEs x in the sub-graph. The allocation interval of a PE x is given by $[BP(x), L-FP(x)]$. These allocation intervals reflect the situation at the beginning of the allocation process. The allocation intervals typically change as the allocation process progresses.

Figure 7:
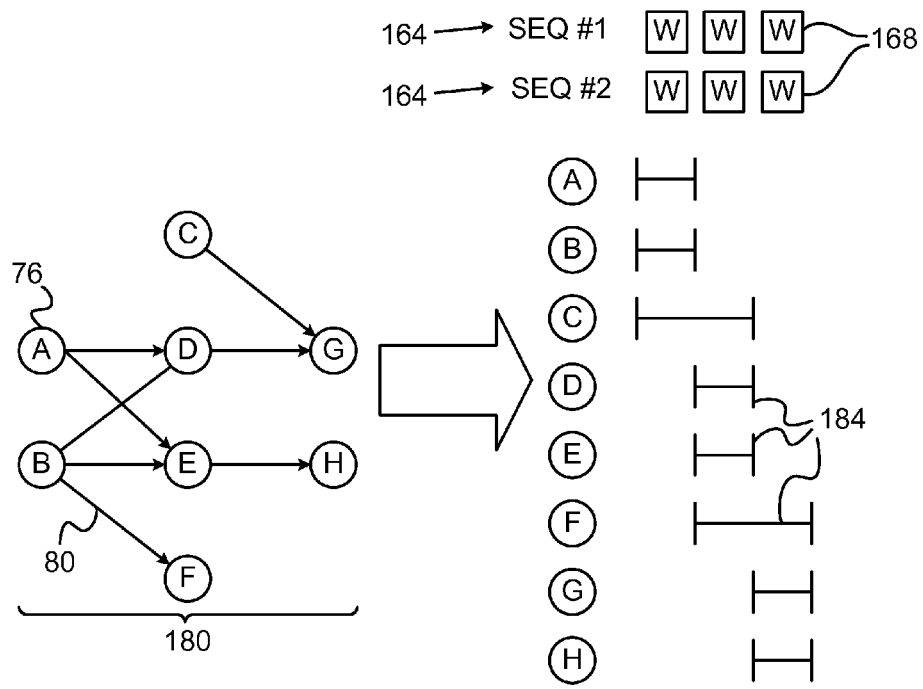
FIG. 7 is a diagram that schematically illustrates allocation intervals for allocating Processing Elements (PEs) in a grid of warps, in accordance with an embodiment of the present invention.

FIG. 7 is a diagram that schematically illustrates allocation intervals for placing PEs in a grid of warps, in accordance with an embodiment of the present invention. FIG. 7 refers to an example sub-graph 180, which comprises eight PEs 76 denoted A . . . H. The PEs are to be placed in a warp grid having two sequences 164. Since the longest path through this graph is three PEs long, each sequence 164 in this example comprises three warp slots 168.

The forward and backward phases of the eight PEs are given in the following table:

|    | PE |   |   |   |   |   |   |   |
| --- | --- | --- | --- | --- | --- | --- | --- | --- |
|    | A | B | C | D | E | F | G | H |
| FP | 2 | 2 | 1 | 1 | 1 | 0 | 0 | 0 |
| BP | 0 | 0 | 0 | 1 | 1 | 1 | 2 | 2 |

At the beginning of the allocation process, i.e., when the warp grid is still empty, the eight PEs have allocation intervals 184 as shown in the figure. In this example, PEs A and B can only be placed in the first column of the grid, since each of them drives a path of two PEs. PE C can be placed anywhere but the last column, since it drives a one-PE path. PEs D and E can only be placed in the second column, since each of them is driven by a certain PE and drives a certain PE. PE F can be placed anywhere but the first column, it is driven by a one-PE path. Finally, PEs G and H can only be placed in the last column, since each of them is driven by a two-PE path.

The example of FIG. 7 demonstrates that some PEs are more heavily-constrained than others in terms of the possibilities of placing them in grid 160. A PE having a short allocation interval is heavily constrained, whereas a PE having a longer allocation interval has more degrees of freedom in allocation.

Figure 8:
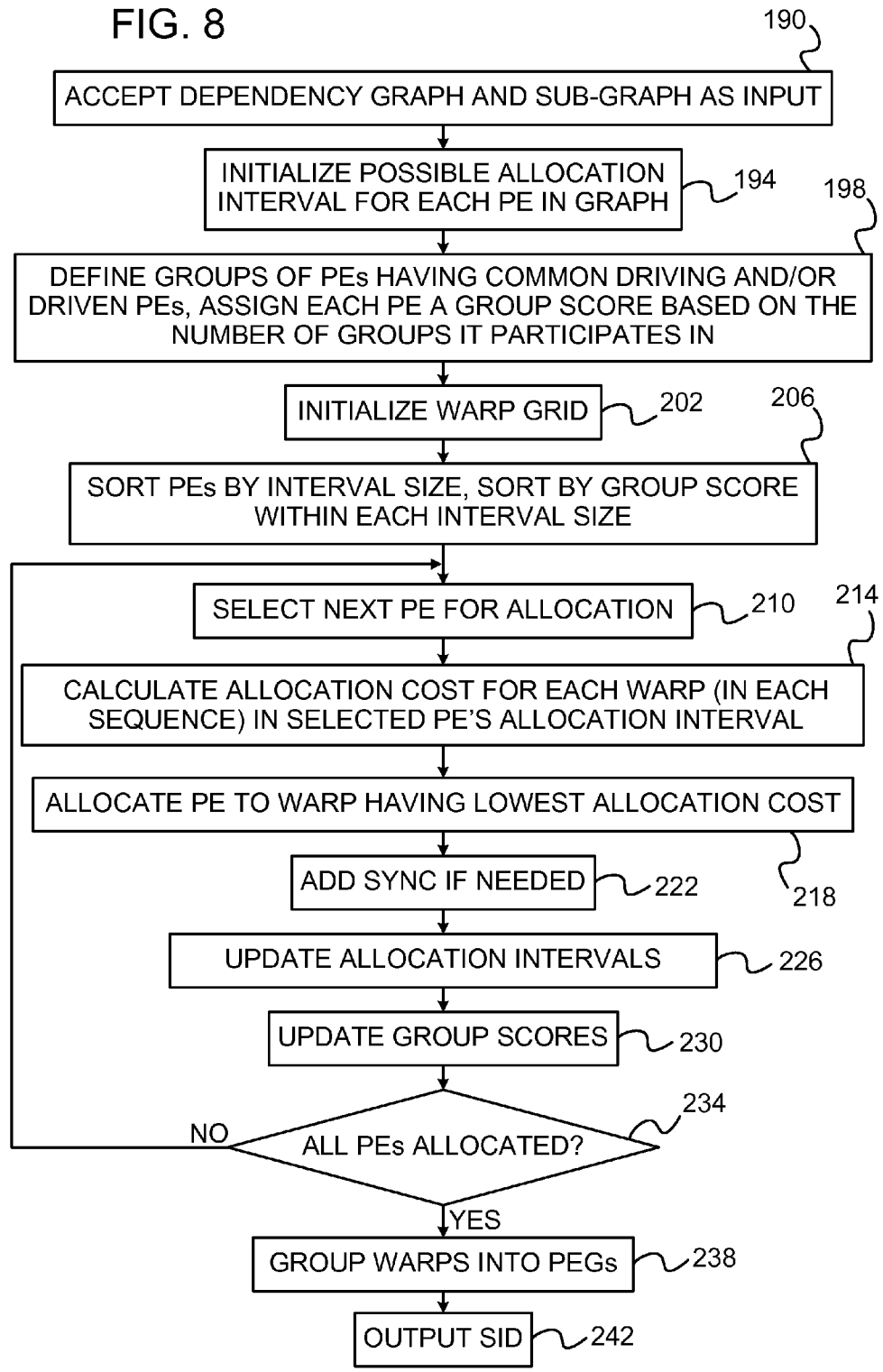
FIG. 8 is a flow chart that schematically illustrates a method for generating a SID, in accordance with an embodiment of the present invention.

FIG. 8 is a flow chart that schematically illustrates a method for generating a SID, in accordance with an embodiment of the present invention. The method begins with the compiler running on CPU 28 accepting a dependency sub-graph for conversion into a SID, at an input step 190. In some embodiments, the compiler also accepts the complete dependency graph from which the sub-graph was derived, which typically comprises additional PEs and dependencies. When generating a single SID irrespective of other SIDs, accepting the complete graph is usually unnecessary. The compiler may use the complete graph, however, when considering other SIDs of other sub-graphs of the same graph. This feature is addressed further below. In addition, the compiler may accept as input the number of execution sequences N, the latency D of a SYNC in warp slot units, the warp size (i.e., the number of PEs per warp) and the PE types.

The compiler initializes an allocation interval for each PE in the sub-graph, at an interval initialization step 194. As explained above, the initial allocation interval of a PE x is given by $[BP(x), L-FP(x)]$.

The compiler defines PE input and output groups, at a group definition step 198. An input group comprises a group of PEs having a common input (i.e., PEs that are driven by the same driving PE). The common driving PE is referred to as the pivot of the group. An output group comprises a group of PEs having a common output (i.e., PEs that drive the same driven PE). The common driven PE is referred to as the pivot of the group.

For example, the compiler may create an output group for every PE x in the entire dependency graph, such that PE x is the pivot of that group. The PEs in this output group comprise the PEs in the sub-graph, which drive PE x. Similarly, the compiler may create an input group for every PE x in the entire dependency graph, such that PE x is the pivot of that group. The PEs in this input group comprise the PEs in the sub-graph, which are driven by PE x. Note that in this example the compiler creates input and output groups for each PE in the entire graph. The PEs in the groups, however, are selected only from the sub-graph and not from the entire graph.

The reason for constructing the input and output groups is that it is generally desirable to place PEs having common inputs and/or outputs in the same execution sequence (although possibly in different warps). The reason for considering the entire graph is that it is sometimes desirable to place in the same sequence PEs that serve as common inputs or outputs of PEs in other SIDs. The compiler assigns each PE in the sub-graph a group score, which is defined as the number of input and output groups that contain the PE.

The compiler initializes a grid of warps having N execution sequences, each sequence having L warp slots, at a grid initialization step 202.

In some embodiments, the compiler pre-sorts the PEs of the sub-graph, at a sorting step 206. The compiler sorts the PEs in increasing order of the size of their allocation intervals. The PEs having the same allocation interval size are sorted in decreasing order of their group score. Subsequently, the compiler selects PEs for placement in the grid according to the sorted order. Thus, the PEs having the shortest allocation intervals are placed in the grid first. For a given allocation interval size, PEs having a large group score (PEs that are members of a large number of input and/or output groups) are placed first. In an alternative embodiment, the compiler may select the next PE for placement in the grid by selecting the M PEs having the shortest allocation intervals (M denoting a predefined integer). From these PEs, the compiler chooses the PE having the largest group score. The above-mentioned allocation orders attempts to allocate the most heavily-constrained PEs first, so as to leave as many degrees of freedom for subsequent allocation iterations.

The compiler selects the next PE for placement in the grid from among the sorted PEs, at a current PE selection step 210. The compiler then computes a respective allocation cost for each possibility of placing this PE in the grid, at an allocation cost computation step 214. Typically, the compiler examines the warp slots within the PE's allocation interval, over the N execution sequences. (In some cases, a certain warp is not a candidate for placing a given PE even though it is within the PE's allocation interval. For example, the warp may already be fully populated, or it may comprise PEs whose type is different from that of the examined PE.)

In some embodiments, the compiler may examine warp slots that lie slightly outside the allocation interval of a given PE. For example, in some cases it may be preferable to deliberately place a PE outside beyond its allocation interval (and thus slightly increase the SID execution time), as opposed to adding a SYNC (which may incur a worse penalty in SID execution time). Thus, in some embodiments, the compiler examines the allocation interval plus a number of warp slots that is on the order of the latency introduced by a SYNC.

The compiler computes an allocation cost for each potential warp slot. The allocation cost is a quantitative measure, which indicates the potential penalty of placing the PE in a particular warp slot.

The compiler may apply any suitable criteria or heuristic in computing allocation costs. In an example implementation, the following rules can be used:

- Increase the cost by 1000 for each warp-slot delay in the total SID execution time, which would be caused by placing the PE in the examined warp slot. This rule imposes a severe penalty for increasing the total execution time.
- Reduce the cost by 10 for each PE, which is already placed in the same sequence as the examined warp slot and is a member of an input or output group that also contained the examined PE. This rule gives preference to placing members of input or output groups in the same sequence.
- Reduce the cost by 10 for each execution dependency (direct or indirect, forward or backward), which is associated with the examined PE and whose other PE resides in the same sequence as the examined warp slot. This rule gives preference to placing both ends of an execution dependency in the same sequence (and potentially avoiding insertion of a SYNC between sequences).
- Increase the cost by the column distance from the optimal column of the examined PE. The optimal column of a PE x is defined as BP(x)·L/ORIG_L, wherein L denotes the current number of populated columns in the grid, and L_ORIG denotes the longest path in the sub-graph. Note that the optimal column may fall outside of the allocation interval of the PE.

In some embodiments, the compiler may compute the allocation cost by examining the different critical sub-graph paths that traverse the PE and calculating their durations, assuming the PE were placed at a certain warp slot. This sort of calculation would consider the additional SYNCs that would be added and their associated costs. Further additionally or alternatively, the compiler may assign allocation costs to the different warp slots in the examined PE's allocation interval using any other suitable criterion or heuristic.

The compiler now places the PE in the warp slot having the lowest allocation cost, at a placement step 218. If necessary due to the new placement, the compiler inserts a SYNC, at a SYNC insertion step 222. A SYNC has a predefined duration of an integer number of warp slots, e.g., two slots. Each SYNC comprises a list of one or more warps whose execution must finish before the SYNC resumes execution of its own sequence. The warps that are polled by a given SYNC may reside in any number of sequences. The list typically may not contain multiple warps from the same sequence.

The compiler updates the allocation intervals of the remaining unallocated PEs to reflect the placement possibilities following the new placement, at an interval updating step 226.

In some embodiments, the compiler updates the group scores of the remaining PEs following the new placement, at a group score updating step 230. For example, the compiler may increase the group scores of PEs that share the same input or output group with the newly-placed PE. This rule gives preference to input or output groups whose members are already partially allocated. As another example, the compiler may increase the group scores of PEs that share an execution dependency (direct or indirect, forward or backward) with the newly-placed PE.

The compiler checks whether all PEs in the sub-graph have been placed in the warp grid, at a checking step 234. If there are remaining PEs for allocation, the method loops back to step 210 above, in which the compiler selects the next PE to be placed. If all PEs have been allocated, the compiler groups successive warps into PEGs, at a PEG creation step 238. Typically, each PEG may comprise only a certain number of successive warps of the same sequence, e.g., a maximum of two warps, plus possibly a SYNC. In addition, a PEG may comprise only PEs that are independent of one another, since there is no guarantee as to the order of PE execution within the PEG. In FIG. 6 above, for example, some PEGs 176 comprise only a single warp, some PEGs comprise two warps, and one of the PEGs comprises one warp and one SYNC.

At this stage, the compiler outputs the resulting populated warp grid (a set of N PEG execution sequences) as the desired SID, at an output step 242.

Typically, the SID generation process described above assumes that the warp slot duration takes into account the durations of the different PEG operations, such as load, synchronization, execution and store commands. In some cases, however, load and store command durations can be neglected. The description above assumes that all warps are of the same duration, and that the duration of a SYNC is an integer multiple of a warp slot. The description also assumes that the duration of a PEG is equal to the sum of durations of its warps and SYNCs. All of these assumptions, however, are not mandatory, and alternative SID generation schemes may make other assumptions.

In some cases, the compiler has to increase the maximum execution sequence length, i.e., the total SID execution time. Increasing L may be needed, for example, when the compiler is unable to place a certain PE in any of the warps in the PEs allocation interval. L may also be increased following insertion of a SYNC, although some SYNC insertions do not cause an increase in L. An increase in L typically means that previously-placed warps and SYNCs beyond a certain column are pushed to the right. This push may trigger a chain of subsequent push-right operations of other warps and/or SYNCs. When computing the allocation cost of a certain warp position (at step 214 above), the cost is usually increased only in response to push-right operations that increase the overall SID execution time L. Push-right operations that do not change L typically do not incur allocation cost.

In many situations, the compiler encounters several options for placing a given PE. In some cases, it may not be globally optimal to place a given PE in the lowest-cost position (at step 218 above) because this placement may cause considerable penalties in future PE placements. Therefore, the compiler may improve the PE allocation process by considering two or more alternative SIDs in parallel, and carry out two or more respective alternative allocation processes in these SIDs. Various search methods, such as "A-star" schemes or even genetic search algorithms, may be used to converge to the globally best SID.

Memory Management for Efficient Sid Operation

As can be appreciated, executing a SID on GPU 32 often involves large numbers of memory access operations. In the GPU, data can be stored in device memory 56 or in shared memory 52. Device memory 56 typically offers large storage space (e.g., several Gigabytes), but access to this memory is costly in terms of latency. Typically, multiprocessors 40 access device memory 56 at a large granularity (e.g., 512 bits at a time). Thus, the cost of reading or writing a single bit to device memory 56 is similar to the cost of reading or writing 512 bits. Read and write commands to device memory 56 are typically aligned to these large-granularity addresses. On the other hand, shared memory 52 in each multiprocessor can be accessed by processors 44 of that multiprocessor at a relatively fast access time, in small granularity and without alignment. The size of shared memory 52, however, is considerably smaller than that of the device memory (e.g., on the order of Kilobytes as opposed to Gigabytes).

In some embodiments of the present invention, the PEG sequences in the SID use shared memories 52 as cache memories, in order to access device memory 56 efficiently and minimize the associated latency penalties. In the description that follows, the terms "shared memory" and "cache" are sometimes used interchangeably.

It is important to note that the caching and memory management schemes described herein are fully-determined during compilation, and remain deterministic throughout SID execution. This feature is in contrast to some known caching schemes, whose operation may vary according to data at runtime and are therefore statistical in nature. In the techniques described herein, the pattern and timing at which data is requested and produced by the different PEG sequences is known a-priori during compilation. The compiler may exploit this knowledge and decide on certain optimal memory management means (e.g., caching in or out of a certain variable at a certain time, or consolidating multiple read requests into a single read operation) that access device memory 56 efficiently. These means will be carried out deterministically by the GPU at runtime.

Figure 9:
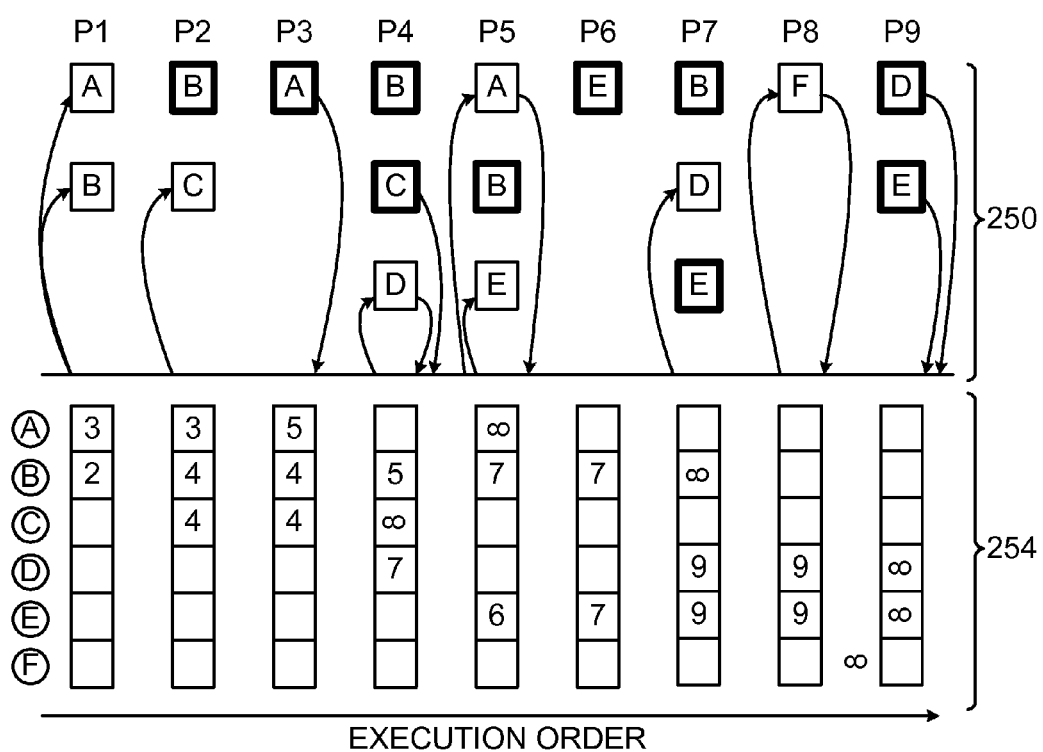
FIG. 9 is a diagram that schematically illustrates a cache management scheme, in accordance with an embodiment of the present invention.

FIG. 9 is a diagram that schematically illustrates a cache management scheme, in accordance with an embodiment of the present invention. FIG. 9 refers to a specific PEG execution sequence, which comprises nine PEGs denoted P1 ... P9. The PEGs use as input six variables denoted A ... F, with each PEG using a certain subset of these variables. In the present example, shared memory 52 can hold a maximum of three variables at any given time. The compiler defines a deterministic caching pattern, which specifies when certain variables are to be fetched from device memory 56 into shared memory 52 and when certain variables are to be discarded, so as to optimize the use of the limited-size shared memory and minimize the number of read operations from the device memory.

A region 250 at the top of the figure shows the variables used as input by each PEG. For example, PEG P1 uses variables A and B as input, PEG P2 uses variables B and C, PEG P3 uses only variable A, and so on. An up-pointing arrow denotes a variable that is fetched from device memory 56 to shared memory 52 for use as input by the corresponding PEG. A down-pointing arrow denotes a variable that is discarded from the shared memory following execution of a PEG, in order to free space for a variable needed in the next PEG. A variable marked with a bold frame denotes a cache hit, i.e., a variable that is already present in the cache and need not be fetched from the device memory. For example, in preparation for executing PEG P2 it is not necessary to fetch variable B from the device memory, since it is already present in the shared memory from the previous PEG.

A region 254 at the bottom of the figure shows the content of shared memory 52 at the beginning of each PEG. For example, at the beginning of PEG P1 the shared memory holds variables A and B. Variable C is fetched at the beginning of PEG P2, and the shared memory thus holds variables A, B and C. The cache does not change during PEG P3. PEG P4, however, needs variable D as input. Therefore, variable A is discarded at the end of PEG P3 and variable D is fetched at the beginning of PEG P4. The process continues throughout the PEG sequence execution.

For each variable that is present in the shared memory at a given time, the compiler records the identity of the next PEG in the sequence that will request this variable as input. The compiler typically determines these PEG identities by scanning the PEG sequence according to the execution order. The recorded PEG identities are shown in region 254 at the bottom of the figure. For example, when variables A and B are fetched at the beginning of PEG P1, the compiler notes that variable A will be requested next by PEG P3, and that variable B will be requested next by PEG P2. As another example, at the beginning of PEG P3, the compiler notes that variable A will be requested next by PEG P5, and variables B and C will both be requested next by PEG P4. A symbol ∞ indicates a variable that will not be requested by any of the subsequent PEGs in the sequence.

Using these records, the compiler decides which variable is to be discarded when space is to be freed in the shared memory. When a variable needs to be discarded, the compiler typically selects to discard the variable which will be requested by a PEG that is furthest away in the sequence, i.e., has a largest distance from the current PEG. Consider, for example, the situation at the end of PEG P3. At this point in time, the shared memory holds variables A, B and C. One of these variables needs to be flushed out in order to enable fetching of variable D for PEG P4. Since variable A will be requested by PEG 5 and variables B and C will be requested earlier by PEG P4, variable A is discarded.

The example of FIG. 9 refers to a specific sequence, specific variables and a specific cache size. Generally, however, this cache management scheme can be used with any other suitable PEG sequence, set of variables and cache size. In alternative embodiments, the compiler may design the caching-in and caching-out of variables in shared memory 52 using any other suitable criterion. The multiprocessor 40 that is assigned by the GPU to execute a given PEG sequence fetches variables from device memory 56 to shared memory 52 according to the deterministic pattern set by the compiler. Typically, a similar process is carried out for each PEG sequence in the SID. The compiler may use any suitable data structures for recording the PEGs that will request the different variables.

In some embodiments, the compiler aggregates the fetching of multiple variables from device memory 56 into shared memory 52 in a single fetch command, so as to reduce the number of costly fetch operations from the device memory. As noted above, in a typical GPU the overhead of fetching a single variable from the device memory is similar to the overhead of fetching variables that occupy 512 bits, and therefore it is advantageous to aggregate and fetch a large number of variables in a single command.

FIGS. 10A and 10B are diagrams that schematically illustrate a variable pre-fetching scheme, in accordance with an embodiment of the present invention. The present example refers to a PEG execution sequence, which comprises nine PEGs denoted P1 . . . P9. The PEGs use as input six variables denoted A . . . D, S and T. Variables A . . . D are used internally to the present SID, whereas variables S and T comprise inter-SID variables. In each of FIGS. 10A and 10B, each column corresponds to a certain PEG in the sequence, and each row corresponds to a certain variable.

Each variable is marked with a shaded pattern from the point this variable is requested as input by a certain PEG. For example, variable B is first requested by PEG P3, and therefore this variable is marked with a shaded pattern from PEG P3 onwards. Vertical lines 258 indicate SYNCs between the present PEG sequence and some other sequence or sequences, which are carried out by the subsequent PEGs. In the present example, SYNCs are carried out by PEGs P1, P4 and P7. For each SYNC 258, one or more marks 262 indicate the specific variables that are synchronized by the SYNCs. For example, the SYNC carried out by PEG P4 halts execution until variables C and D are ready by another sequence.

In some embodiments, the compiler scans the PEG sequence and sets the timing of device memory fetch commands, as well as the variables that are fetched by each command. Typically, the compiler attempts to set the timing and content of the fetch commands while considering (1) the distances to the PEGs that will need each variable, and (2) a number of fetch operations per command that is considered efficient. Based on this information, the compiler attempts to combine fetching of two or more variables in a single command.

In some embodiments, the compiler scans the PEG sequence in reverse order (i.e., opposite of the execution order). For each variable, the compiler marks a respective fetching interval, i.e., a time interval during which the variable can be fetched. This time interval begins at the time the variable becomes valid, and ends at the PEG that first requests this variable as input. The compiler then sets the timing and content of the fetch operations based on these time intervals.

Typically, for each variable and for each PEG, the compiler marks the distance (in PEG units) of the PEG from the PEG that will first request this variable, as long as the variable is valid. A given variable can be assumed valid following the latest SYNC 258 that is associated with this variable. The distances marked by the compiler in the present example are shown in FIGS. 10A and 10B. For example, variable D is first requested by PEG P6, and may be fetched anytime starting from PEG P4 (following the SYNC that waits on this variable). The compiler sets the timing and content of the fetch operations based on the marked distances. For example, the compiler may scan the PEG sequence along the execution order, identify variables that need to be fetched, and combine them with fetching of other variables in order to produce efficient fetch commands. The compiler may combine two or more variables whose fetching intervals overlap. The combined fetch command is positioned during this overlap.

Assume, for example, that a command that fetches two variables is considered efficient, but a command that fetches only a single variable is not. In the example of FIG. 10B, no variables need to be fetched in preparation for PEGs P1 and P2. PEG P3, however, needs variable B as input, and therefore the compiler defines a fetch command from device memory 56 to take place in preparation for PEG P3. In order to access the device memory efficiently, the compiler aggregates another variable fetching in the same command. The compiler selects the valid variable whose distance from the current PEG (i.e., the distance from the current PEG to the PEG that will first request this variable) is minimal.

In the present example, variables S and T are valid at this time, and variable T has a smaller distance (3 compared to 6). Therefore, the compiler defines the fetch command so as to fetch variables B and T. Once these variables are fetched, they are crossed out from the list so that they will not be fetched again. The process continues using similar logic, and the compiler defines two additional fetch commands—one that fetches variables C and D before PEG P4, and another that fetches variables A and S before PEG P9. Using this technique, each variable is fetched after it becomes valid and before it is first needed as input, and the fetch commands are defined efficiently by aggregating the fetching of multiple variables per command.

The example of FIGS. 10A and 10B refers to a specific sequence, specific variables, a specific number of fetches per command and a specific selection criterion. Generally, however, the compiler may apply a pre-fetching scheme having any other suitable PEG sequence, variables, number of fetches per command and/or selection criterion. Typically, a similar process is carried out for each PEG sequence in the SID. The compiler may use any suitable data structures for recording the time intervals and distances described above.

In some embodiments, the compiler delays the storage of variables (outputs produced by the PEGs) in device memory 56, and aggregates multiple variables per storage command. Storing multiple variables per command reduces the latency and overhead associated with storage in device memory 56. A delayed storage mechanism of this sort can be carried out using similar criteria to the pre-fetching mechanism of FIGS. 10A and 10B. For example, the compiler may identify, for each variable, the time interval from the PEG that produced the variable value until the point the variable is needed as input (e.g., by a PEG in another sequence, which possibly belongs to a different SID). When the variable is needed as input by a sequence in another SID, the compiler may regard the end of the sequence producing this variable (and not the individual PEG within this sequence) as the time at which the variable is ready. The compiler may then define multi-variable storage commands based on these time intervals.

As shown in FIG. 9 above, when a given multiprocessor 40 executes a given PEG sequence, the multiprocessor loads variables from device memory 56 in a particular deterministic order, caches them in the shared memory and provides them as input to the different PEGs in the sequence. In some embodiments, the compiler pre-orders the variables in device memory 56 according to the order in which the PEG sequence will load them. When using this mechanism, a given PEG sequence can fetch variables from device memory 56 using an ordered sequence of fetch operations to successive memory addresses.

Figure 11:
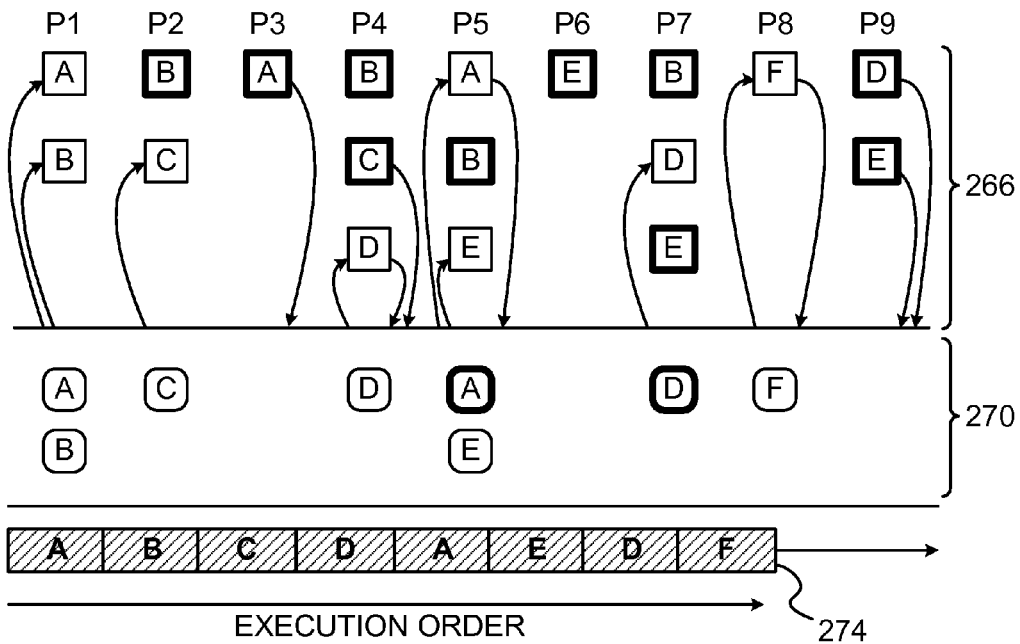
FIG. 11 is a diagram that schematically illustrates a variable pre-ordering scheme, in accordance with an embodiment of the present invention.

FIG. 11 is a diagram that schematically illustrates a variable pre-ordering scheme, in accordance with an embodiment of the present invention. The example of FIG. 11 shows the caching mechanism of FIG. 9 above. A region 266 at the top of the figure shows the variables cached into and flushed out of shared memory 52 by the different PEGs in the sequence. A region 270 shows the variables that are fetched from device memory 56 in preparation for each PEG. A bold frame marks a variable that was already read by a previous PEG in the sequence, but was flushed out of the shared memory in the interim.

In some embodiments, the compiler stores the variables in device memory 56 in a feeder region 274. In feeder region 274 of a certain PEG sequence, the variables are stored in the order in which they will be fetched by that PEG sequence. Note that a given variable may be stored at two or more different locations along the feeder region, since the PEG sequence may re-read variables due to the limited cache size. Note also that each PEG sequence has a corresponding feeder region in device memory 56. A given variable may be stored in multiple feeder regions of different PEG sequences.

Typically, the pre-ordered variables are arranged in the device memory in basic sections that conform to the GPU's memory alignment and size specifications. These sections are referred to herein as cache-lines. In a typical GPU, each cache-line comprises 512 bits. Typically, PEGs in different sequences produce, consume and exchange variables in cache-line units.

Inter- and Intra-Sid Communication

As explained above, the compiler converts each dependency sub-tree into a SID. In some embodiments, variables that are produced by a PEG in one SID are used as input by a PEG in another SID. Communication between PEGs in different SIDs is typically carried out via device memory 56. In some embodiments, the compiler stores variables that are communicated between SIDs in data structures called mailboxes. Each mailbox comprises variables that are generated and/or used by common PEG sequences. Communication between SIDs is carried out by writing and reading cache-lines to and from mailboxes. Thus, access to device memory 56 is carried out efficiently by exploiting the usage and generation commonality between different variables.

Figure 12:
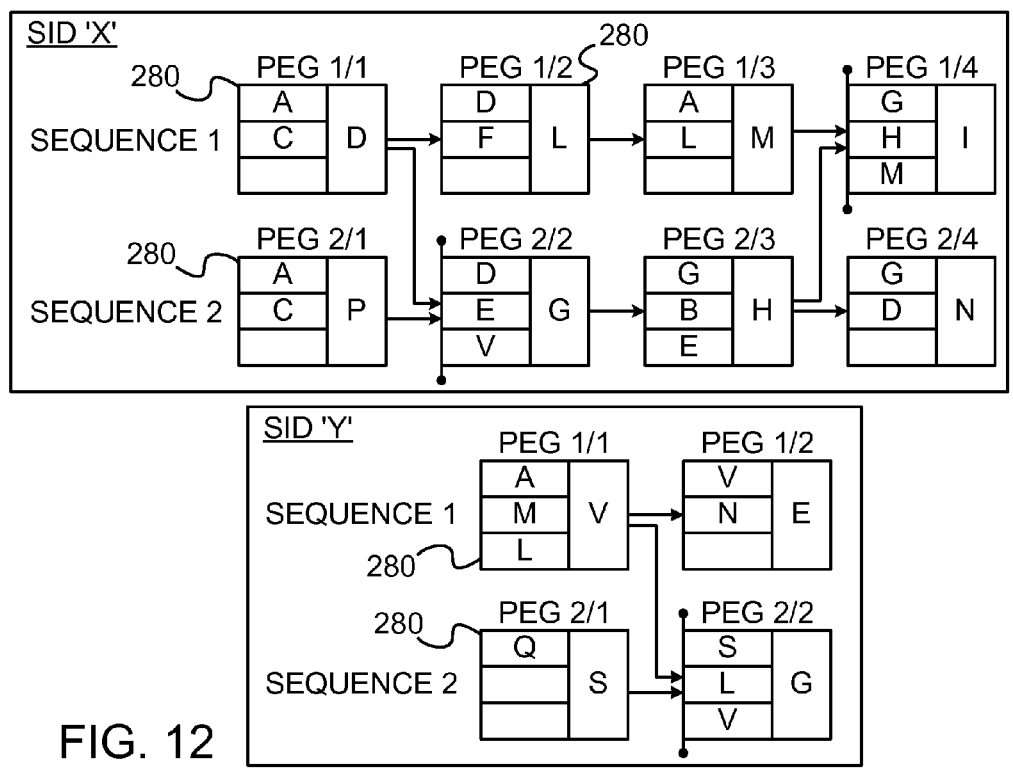
FIG. 12 is a diagram that schematically illustrates multiple SIDs, in accordance with an embodiment of the present invention.

FIG. 12 is a diagram that schematically illustrates multiple SIDs, in accordance with an embodiment of the present invention. The present example shows two SIDs denoted SID-X and SID-Y. SID-X comprises two PEG sequences, each comprising four PEGs 280. SID-Y comprises two PEG sequences, each comprising two PEGs 280. Each PEG accepts as input up to three input variables (which are shown on the left-hand-side of its respective block) and produces an output variable (which is shown on the right-hand-side of its respective block). PEG 1/1 in SID-X, for example, accepts variables A and C as input and generates variable D. Some dependencies between sequences may also exist within each SID, such as between PEG 2/3 and PEG 1/4 in SID-X.

Certain variables are defined as ingress and egress variables, i.e., variables that are input from and output to the CPU (or other host environment), respectively. In the present example, the ingress variables comprise variables A, B, C, F and Q. The egress variables comprise variables S, G, H and P.

In a given SID, the variables can be classified into generated variables (which are generated by the SID), used variables (which are used as input by the PEGs in the SID) and input variables (which are used as input by the PEGs in the SID but are not produced internally in the SID). Overlap may sometimes exist between the different classes. In the present example, the variable classification is shown in the following table:

| SID | X | Y |
|---|---|---|
| Generated variables | D, L, G, M, H, I, N, P | V, S, E, G |
| Used variables | A, B, C, D, E, F, G, L, H, M, V | A, M, L, Q, V, N, S |
| Input variables | A, B, C, E, F, V | A, M, L, Q, N |

Figure 13:
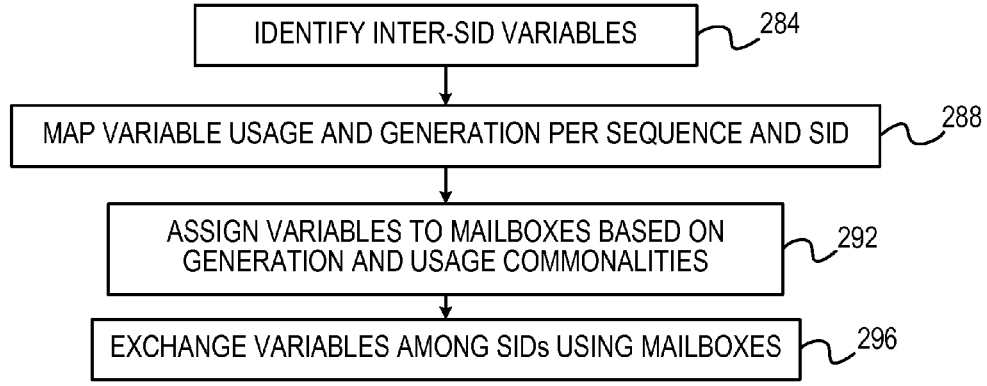
FIG. 13 is a flow chart that schematically illustrates a method for inter-SID communication, in accordance with an embodiment of the present invention.

FIG. 13 is a flow chart that schematically illustrates a method for inter-SID communication, in accordance with an embodiment of the present invention. The method begins with the compiler identifying a set of inter-SID variables, at an inter-SID identification step 284. The inter-SID variables comprise those variables that are not ingress or egress variables, and that are to be exchanged between different SIDs. The compiler may identify the inter-SID variables by (1) identifying the set of all input variables of all SIDs, and (2) removing the ingress and egress variables from this set. In the present example, the set of input variables of SIDs X and Y is {A, B, C, E, F, M, L, Q, N, V, P}, the set of ingress variables is {A, B, C, F, Q} and the set of egress variables is {S, G, H, P}. Thus, the set of inter-SID variables is {E, M, L N, V}.

Then, the compiler maps the inter-SID variables in terms of their usage and generation by the different PEG sequences of the different SIDs, at a usage/generation mapping step 288. In the present example, the usage and generation of the different inter-SID variables is given in the following table:

| Variable usage | Variable generation |
|---|---|
| E←(X2) | E→(Y1) |
| M←(Y1) | M→(X1) |
| L←(Y1, Y2) | L→(X1) |
| N←(Y1) | N→(X2) |
| V←(X2) | V→(Y1) | wherein M→(X1) denotes that variable M is generated by sequence 1 in SID-X, for example. Generally, a given inter-SID variable may be generated and/or used by any desired number of sequences belonging to any desired number of SIDs.

The compiler then groups together inter-SID variables that are generated by common sequences and used by common sequences, at a grouping step 292. The compiler defines a data structure, referred to as a mailbox, for each such group. The mailboxes are stored in a certain region in device memory 56. Each mailbox typically comprises one or more cache-lines. In the present example, the compiler may define the following four mailboxes:

| Mailbox # | Inter-SID variables | Usage/generation sequences |
|---|---|---|
| 1 | E, V | (Y1)→(X2) |
| 2 | M | (X1)→(Y1) |
| 3 | L | (X1)→(Y1, Y2) |
| 4 | N | (X2)→(Y1) |

At runtime, different SIDs communicate with one another by writing cache-lines to the mailboxes and reading cache-lines from the mailboxes, at an inter-SID communication step 296. Since each mailbox comprises inter-SID variables that are generated by the same sequences and used by the same sequences, access to device memory 56 is efficient.

The efficiency of the mailbox mechanism depends, at least partially, on the allocation of PEs to PEG sequences within each SID. As explained in FIG. 8 above, the compiler attempts to group in the same PEG sequence PEs that communicate with the same PEs in other SIDs. If this grouping is successful and well-defined, the method of FIG. 13 will produce a relatively small and well-defined group of mailboxes, with each mailbox containing a relatively large number of variables.

In some embodiments, the compiler can further improve the efficiency of accessing device memory 56 by ordering the variables inside each mailbox according to the order in which they are requested by the PEG sequences.

In some embodiments, different PEG sequences within the same SID may transfer variables to one another. This form of communication is referred to herein as intra-SID communication. PEG sequences within the same SID typically communicate by exchanging cache-lines comprising variable values via device memory 56. Intra-SID communication is typically subject to variable validity constraints. In other words, a certain PEG sequence may transfer a variable to another sequence only after the PEG producing the variable has completed execution. In some embodiments, the compiler defines communication transactions between PEG sequences, in a manner that preserves the execution dependencies and minimizes the number of transactions (in cache-line resolution). Intra-SID communication is typically carried out over the SYNC elements introduced between sequences. In other words, a SYNC element, which halts execution of one sequence until one or more PEGs in other sequences finish execution, may also transfer variables from these other sequences to the halted sequence.

Figure 14A:
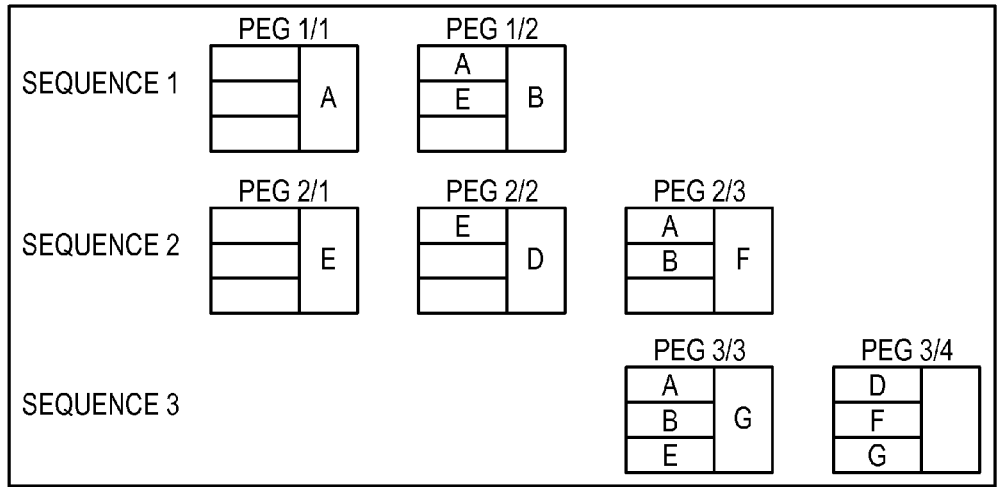
FIGS. 14A and 14B are diagrams that schematically illustrate an intra-SID communication scheme, in accordance with an embodiment of the present invention.
Figure 14B:
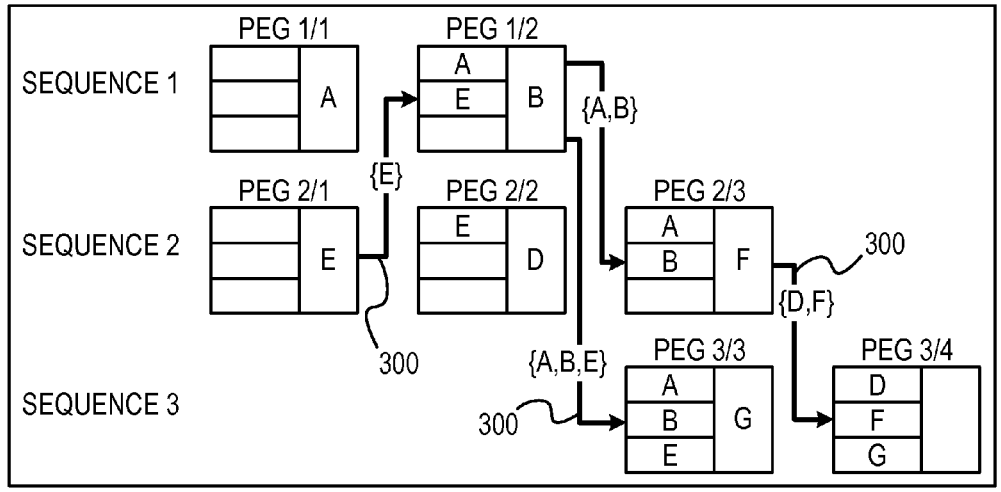

FIGS. 14A and 14B are diagrams that schematically illustrate an intra-SID communication scheme, in accordance with an embodiment of the present invention. FIG. 14A shows an example SID having three PEG sequences. For each PEG, the input variables are shown on the left-hand-side of the PEG block and the output variable is shown on the right-hand-side of the block.

FIG. 14B shows four cache-lines 300, which are defined by the compiler for transferring variables between PEG sequences in the SID of FIG. 14A. The variables passed by each cache-line are marked in brackets in the figure. The compiler may use any suitable process, such as various dynamic programming techniques, for defining cache-lines 300. Typically, the solution is not unique and multiple solutions are feasible. The compiler attempts to identify the solution that meets a predefined criterion, such as minimizing the number of cache-lines 300.

Techniques for Improving Inter-Sid Communication Efficiency

As described above, exchanging of inter-SID variables between different SIDs is carried out by storing the variables in mailboxes in device memory 56. Each mailbox comprises one or more cache-lines, and is associated with a set of one or more source execution sequences (in one or more source SIDs) and a set of one or more target execution sequences (in one or more target SIDs). Typically, the inter-SID variables are assigned to mailboxes such that (1) variables that are generated and used by the same set of SIDs and execution sequences are assigned to the same mailbox, (2) variables that are not generated and used by the same set of SIDs and sequences are assigned to separate mailboxes, so as not to share the same cache-line, and (3) each variable appears exactly once within the collection of mailboxes.

In some cases, however, the generation and usage of inter-SID variables does not enable efficient grouping of the variables into mailboxes. Such grouping may produce mailboxes having a small number of variables. Since the device memory is read in cache-line units regardless of the actual number of variables residing in the cache-lines, mailboxes having few variables may cause poor cache-line utilization.

In some embodiments, the compiler combines two or more inter-SID cache-lines from sparsely-populated mailboxes, to produce densely-populated cache-lines. By combining cache-lines, the number of load operations from the device memory may be reduced. The extent of reduction depends on the choice of cache-lines to be combined. For example, the compiler may attempt to combine inter-SID cache-lines having relatively large overlap in the set of target execution sequences.

Consider, for example, a cache-line A that is used by sequences S1 and S2, and a cache-line B that is used by sequences S1, S2 and S3. Assume also that cache-lines A and B are sufficiently sparse, so that it is possible to combine them into a new cache-line C without exceeding the cache-line size limitation. In this example, after combining cache-lines A and B to form cache-line C, each of sequences S1 and S2 will have to load only a single cache-line (the combined cache-line C) instead of two cache-lines. Sequence S3 will still have to load a single cache-line (cache-line C instead of cache-line B). Overall, the number of load operations from the device memory is reduced as a result of combining Cache-lines A and B. In alternative embodiments, the compiler may combine any desired number of cache-lines.

Alternatively, the compiler may combine inter-SID cache-lines whose variables can be transported between target execution sequences in the target SID using intra-SID communication mechanisms (i.e., using the synchronization elements between sequences). The concept of exploiting under-used intra-SID communication resources for improving inter-SID communication is described in detail further below. Consider, for example, a configuration of three execution sequences S1, S2 and S3, and three cache-lines A, B and C. In this example, sequence S1 has input variables from cache-line A, sequence S2 has input variables from cache-line B, and sequence S3 has input variables from cache-line C. Assume also that the synchronization mechanisms between the sequences enables data transfer from sequence S1 to sequence S2. Within sequence S2, input variables from cache-line B are needed only by PEGs that are positioned after the synchronization with sequence S1. In this situation, it is advantageous to combine cache-line A with cache-line B, and to transfer the variables of cache-line B over the synchronization mechanism between sequence S1 and sequence S2. When using such a scheme, sequence S2 does not need to load cache-line B, since it receives its variables from sequence S1 over the synchronization mechanism. Thus, the compiler may reduce the number of load operations from the device memory by (1) combining cache-lines used by different target sequences, and (2) transferring variables from one target sequence to another using intra-SID communication.

Regardless of whether inter-SID cache-lines are combined or not, the compiler may reduce the number of inter-SID cache-line load operations from the device memory by exploiting under-used intra-SID communication resources, as explained in the following description.

Figure 15:
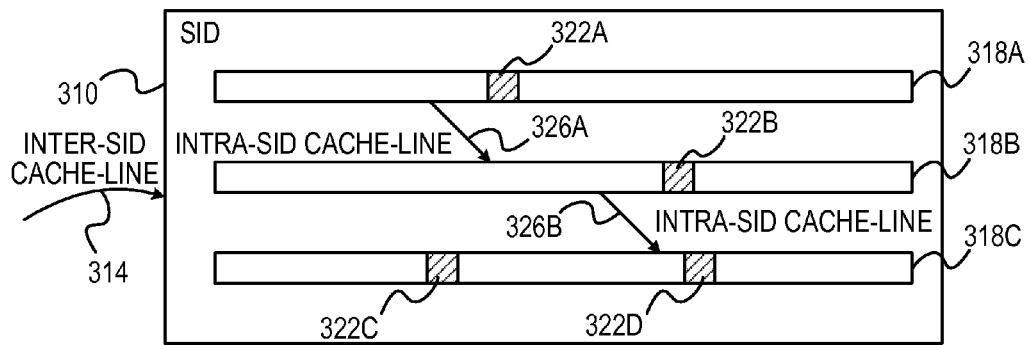
FIG. 15 is a diagram that schematically illustrates a SID that uses inter-SID and intra-SID communication, in accordance with an embodiment of the present invention.

FIG. 15 is a diagram that schematically illustrates a SID 310 that uses both inter-SID and intra-SID communication, in accordance with an embodiment of the present invention. SID 310 receives inter-SID variables from another SID by loading an inter-SID cache-line 314. In the present example, intra-SID variables from cache-line 314 are used by three execution sequences 318A ... 318C in SID 310. (SID 310 may well comprise additional execution sequences that do not use variables from this inter-SID cache-line.)

Without using intra-SID resources to transfer inter-SID variables, each of the three sequences 318A ... 318C would need to load cache-line 314 separately from the appropriate mailbox in device memory 56, in order to obtain its input variables. Thus, three separate load operations would be required. Alternatively, cache-line 314 may be loaded by only a subset of the sequences (e.g., by a single sequence), and the other sequences may receive the variables using intra-SID communication.

In SID 310, for example, a SYNC 326A synchronizes a certain PEG in sequence 318B to a certain PEG in sequence 318A, and a SYNC 326B synchronizes a certain PEG in sequence 318C to a certain PEG in sequence 318B. Each SYNC is associated with an intra-SID cache-line, which depends on the SYNC and transfers variables from the synchronizing sequence or sequences to the synchronized sequence (or, more accurately, from the synchronizing PEG or PEGs to the synchronized PEG). For example, SYNC 326A is associated with an intra-SID cache-line that transfers variables from sequence 318A to 318B.

Assuming the intra-SID cache-lines have free unallocated bandwidth, they can be used to transfer data from sequence 318A to sequence 318B and from sequence 318B to sequence 318C. Thus, in some cases all three sequences 318A ... C may obtain the variables of inter-SID cache-line 314 by having only sequence 318A actually load the cache-line from the device memory, and then transfer the variables over the intra-SID cache-lines that depend on SYNCs 326A and 326B to sequences 318B and 318C.

Note that this solution is feasible assuming that, in a given sequence, the PEGs that use the inter-SID variables are located after the SYNC whose intra-SID cache-line is used for transferring the variables to that sequence. A PEG 322A in sequence 318A has access to the inter-SID variables since sequence 318A is the sequence that actually loads the inter-SID cache-line from device memory 56. In sequence 318B, a PEG 322B has access to the transferred variables because it is located after SYNC 326A. In sequence 318C, a PEG 322D has access to the transferred variables since it is located after SYNC 326B. A PEG 322C, on the other hand, does not have access to the transferred variables since it is located before SYNC 326B.

If PEG 322C needs to use variables from inter-SID cache-line 314, then sequence 318C needs to load this inter-SID cache-line separately, incurring an additional load operation. In this scenario, the intra-SID cache-line of SYNC 326B will not be used for variable transfer from inter-SID cache-line 314.

In some embodiments, the compiler attempts to reduce the number of inter-SID cache-line load operations that are performed by a given SID, by assigning available resources over intra-SID SYNCs for carrying inter-SID variables. This process is typically performed for each SID. An example process of this sort is described in FIGS. 16 and 17 below. Alternatively, however, any other suitable process can also be used.

Figure 16:
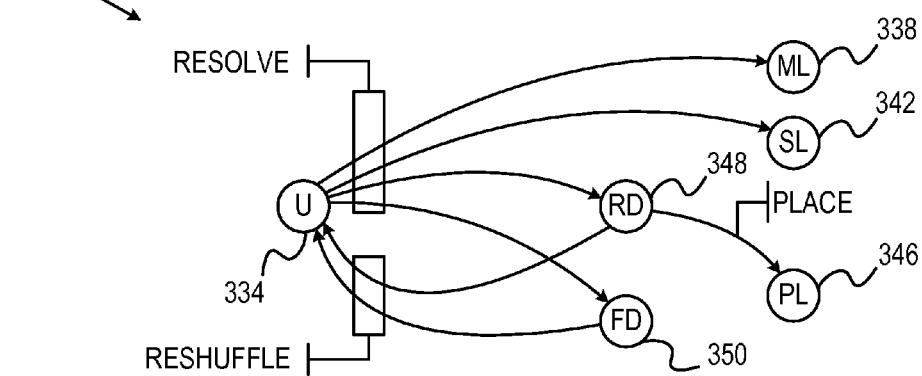
FIG. 16 is a state diagram that schematically illustrates a method for reducing inter-SID communication, in accordance with an embodiment of the present invention.
Figure 17:
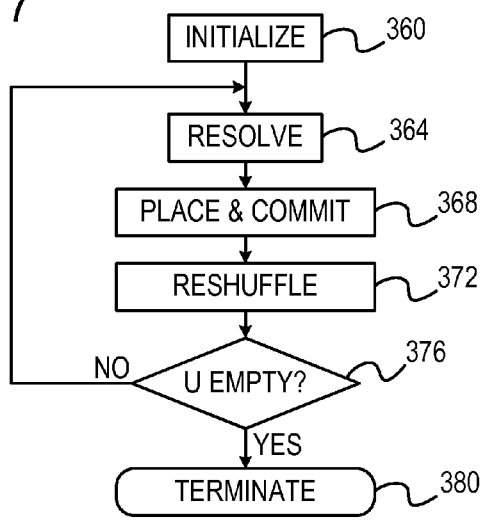
FIG. 17 is a flow chart that schematically illustrates a method for reducing inter-SID communication, in accordance with an embodiment of the present invention.

The process of FIGS. 16 and 17 uses two functions denoted F and P. For a given execution sequence s and an inter-SID variable a, a function $F(s, a)$ is a static function that returns the first entry (PEG) in sequence s that uses variable a as input. In other words, variable a should be provided to the shared memory of sequence s no later than $F(s, a)$. If variable a is not used as input anywhere in sequence s, then $F(s, a)=\infty$.

Function P(s_seq, s_off, t_seq, t_off, req_size) returns a set of (one or more) paths through the SID, over which data of a given size req_size can be transferred from a source sequence s_seq to a target sequence t_seq. The returned paths begin in the source sequence at offset s_off or later, and reach the target sequence at an offset t_off or earlier. Function P may change during compilation in response to allocation of intra-SID communication resources. In some embodiments, P also receives an array of the variables that need to be used at t_off. Function P typically takes into account that some of the variables have already been transferred via the synchronization between sequences. In some embodiments, P returns a combination of multiple paths that can be used for data transfer.

The process also uses a database denote H. For each inter-SID cache-line used by the SID, database H holds a classification of the sequences that use this cache-line into several classes. The classes are typically represented by respective lists. In the present example, the sequences are classified into six classes:

- Must Load (ML): Sequences that must load the cache-line from device memory 56 because they cannot receive the inter-SID variables over intra-SID SYNCs.
- Should Load (SL): Sequences that are requested by the process to load the cache-line from device memory 56, even though they are not ML sequences.
- Placed (PL): Sequences that are to receive the inter-SID variables from other sequences without loading the cache-line, and for which appropriate resources have been allocated over the intra-SID cache-lines.
- Root Dependent (RD): Sequences that are not yet assigned to the SL, ML or P classes, and which can be reached via intra-SID cache-lines at least one sequence in the SL, ML or PL classes.
- Far Dependent (FD): Sequences that cannot be reached by any of the sequences in the SL, ML or PL classes.
    - Unresolved (U): Sequences whose class is still unresolved. (The difference between classes FD and U is that sequences in class FD can be reached from sequences in class RD or FD, but cannot yet be reached from sequences in the SL, ML or PL classes.)

The description that follows refers to a given inter-SID cache-line, which has an associated classification of sequences into classes. The process described below is typically repeated for each inter-SID cache-line.

At any given time, each class may comprise any number of sequences, but a given sequence may appear in only one class. As noted above, only the sequences that use variables from the inter-SID cache-line in question are classified. The process of FIGS. 16 and 17 is an iterative process, which starts with all sequences in the U class. (Typically, the U class initially contains only the sequences that use variables carried over the inter-SID cache line in question. Other sequences are typically ignored.) The process ends with class U empty, all sequences assigned to the SL, ML or P classes. When the process ends, each sequence in the ML and SL classes is defined to load the inter-SID cache-line individually, and the sequences in the P class are defined to receive the inter-SID variables from other sequences without loading the cache-line. Appropriate resources of the intra-SID SYNCs are assigned to deliver the inter-SID variables to the sequences in the P class.

FIG. 16 is a state diagram 330 that schematically illustrates a method for reducing inter-SID communication, in accordance with an embodiment of the present invention. State diagram 330 comprises states 334, 338, 342, 346, 348 and 350, which represent the U, ML, SL, P, RD and FD classes, respectively. Transitions between states are marked by arrows in the figure. The iterative allocation process moves sequences from class to class (from state to state) over these transitions, until class U is empty and all sequences reach the ML, SL or P classes.

FIG. 17 is a flow chart that schematically illustrates a method for reducing inter-SID communication, in accordance with an embodiment of the present invention. (The process is typically repeated for each inter-SID cache-line.) The method begins with the compiler initializing database H, at an initialization step 360. The currently-processed inter-SID cache-line is denoted c. For each sequence s that uses cache-line c (i.e., a sequence that satisfies $F(s, c) \neq \infty$), the compiler adds the sequence to class U.

The compiler then attempts to resolve cache-line c, i.e., to classify the sequences in U, using functions S and P, at a resolving step 364. The resolving step comprises several stages that are performed in succession, as follows:

1) ML resolving stage: For each sequence s in class U, the compiler checks if the variables of cache-line c used by sequence s can be obtained from another sequence that uses this cache-line. (Possible sequences for providing the variables are identified using function F. Possible paths for transferring the variables are identified using function P.) If no sequence and path are found for obtaining the variables to sequence s, the compiler removes sequence s from the U class and adds it to the ML class.
2) RD resolving stage: For each sequence s in class U, the compiler identifies (using F and P) sequences that can obtain the variables they need from cache-line c from a sequence in the ML, SL or PL classes. The compiler removes the identified sequences from class U and adds them to class RD.
3) The compiler repeats the following three sub-stages until class U is empty:
   a) RD sub-stage: Using functions F and P, the compiler identifies sequences that can obtain the variables they need from cache-line c from a sequence in class SL. The compiler removes these sequences from class U and adds them to class RD.
   b) FD sub-stage: Using functions F and P, the compiler identifies sequences that can obtain the variables they need from cache-line c from a sequence in class RD or FD. The compiler removes these sequences from class U and adds them to class FD. If at least one sequence was found, the FD sub-stage is repeated.
   c) SL sub-stage. This stage of the process identifies and resolves cyclic dependency patterns among two or more of the sequences. A detailed example of a cyclic dependency is described in section 10.3.1.2.4 of U.S. Provisional Patent Application 61/185,609, cited above.
      1. The compiler selects a sequence s in class U list of cache-line c. A variable denoted req_offset is set to $F(s, c)$.
      2. Using function P, the compiler scans sequences in class U (other than sequence s) and attempts to identify source sequences that can provide the variables of cache-line c needed by sequence s at an offset that is not later than req_offset.
      3. If a source sequence ss is found, s is set to be s=ss, and req_offset is set to be the offset in which ss needs to have the cache-line c available. The process loops back to step 2 above.
      4. If no source sequence is found, the compiler removes sequence s from class U and adds it to the SL class.

After completing resolving step 364, for a given inter-SID cache-line c, class U is empty and the sequences that use cache-line c are classified to classes ML, SL, RD and FD. The sequences in the ML and SL classes are defined as loading cache-line c individually from device memory 56, and this definition will not change by subsequent iterations of the process.

The compiler now attempts to allocate intra-SID resources for providing the inter-SID variables to the sequences in the RD class, at a placement step 368. Typically, as long as there are sequences remaining in any of the RD class lists in database H, the compiler performs the following process for a given inter-SID cache-line c:

1) From among the sequences in the RD class of cache-line c, the compiler selects the sequence s having the smallest data size it needs from this cache-line. The compiler chooses (using function P) a path p (or a combination of multiple paths), which uses a minimum amount of Intra-SID cache-line resources to deliver the required variables to sequence s from sequences that already possess these variables. Note that if path p traverses more than one hop (i.e., reaches sequence s via one or more intermediate sequences) then the resources over these multiple Intra-SID cache-lines along the path should be taken into account.
2) If no suitable path p is found, step 368 terminates.
3) If a suitable path p is found, the compiler removes sequence s from class RD and adds it to class PL.
4) The compiler commits (allocates) usage of Intra-SID cache-lines over path p to transport the inter-SID variables of cache-line c that are required by sequence s. The compiler refreshes function P to reflect possible changes in possible paths due to the newly-allocated resources.

At this stage, the compiler typically committed intra-SID communication resources to some of the sequences in class RD, and moved them to class PL accordingly. For the sequences remaining in class RD, the compiler did not succeed in finding a path with available resources for providing them with the necessary inter-SID variables.

The compiler now reshuffles the sequences in classes RD and FD, at a reshuffling step 372. In this step, the compiler moves all the sequences in the RD and FD classes (if any remain) to class U. The compiler checks whether class U is empty, at an empty checking step 376. If there are sequences remaining in class U, the method loops back to step 364 above, and the compiler continues to attempt resolving the currently unresolved sequences. If class U is empty, all sequences are classified to classes ML, SL or PL, and the method terminates, at a termination step 380. Each sequence in classes ML and SL will load the inter-SID cache-line individually from the device memory.

Each sequence in class PL will receive the necessary inter-SID variables from other sequences, over a predefined and pre-committed path of one or more intra-SID cache-lines. Thus, when using this technique, the number of inter-SID cache-line load operations from device memory 56 is reduced, and the overall SID execution time is reduced accordingly.

Example Dependency Problem Applications

The methods and systems described herein can be used to solve dependency problems in a wide range of fields and applications. Generally, any computing task that can be represented as a set of Processing Elements (PEs) having execution dependencies, can be parallelized and executed efficiently using the disclosed techniques. The description that follows outlines several example types of dependency problems. The disclosed techniques are in no way limited to these examples, however, and can be used to solve any other suitable type of dependency problem.

In some embodiments, the dependency problem solved by system 20 comprises a task of verifying a hardware design by simulation. This application is addressed in detail in PCT Application PCT/IL2009/000330, cited above. In a typical design verification application, server 24 of FIG. 1 accepts from a user, e.g., a verification engineer, a definition of the design to be simulated. The design is typically accepted as one or more files that are written in a Hardware Description Language (HDL) such as VHDL or Verilog. The server also accepts test-bench definitions, which specify the verification environment of the design. The test-bench specifies external asynchronous events (e.g., clock signals, reset signals and various inputs) that are to be applied to the design. The test-bench also specifies tests that are to be applied to the simulated design. The test bench typically comprises software written in C, Verilog, or in a verification-specific language such as E or System-Verilog.

The compiler running on CPU 28 compiles the test-bench and design to produce simulation code, and then runs the simulation code on CPU 28 and GPUs 32. In particular, the compiler represents the design and test-bench into a dependency graph having PEs and dependencies, extracts a-cyclic sub-graphs from the dependency graph, and generates a SID for each sub-graph. The GPU is then invoked to execute the different SIDs, so as to produce simulation results. The simulation results (e.g., reports as to which tests have passed and which failed, suspected faults, fault locations, and/or any other information that may assist the user in verifying the design) are provided to the user.

Figure 18:
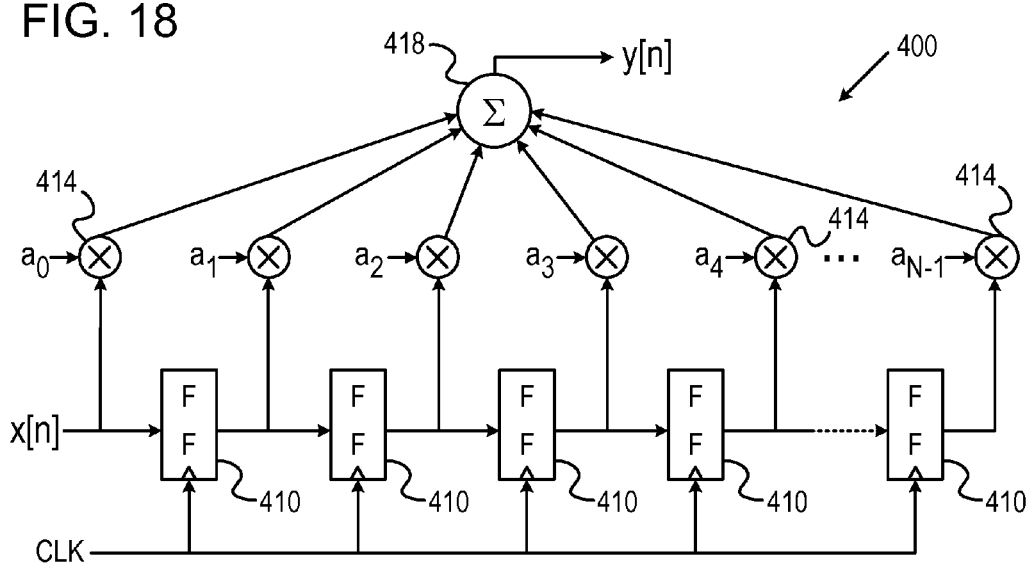
FIG. 18 is a diagram that schematically illustrates a dependency graph representing a digital filter, in accordance with an embodiment of the present invention.
Figure 19:
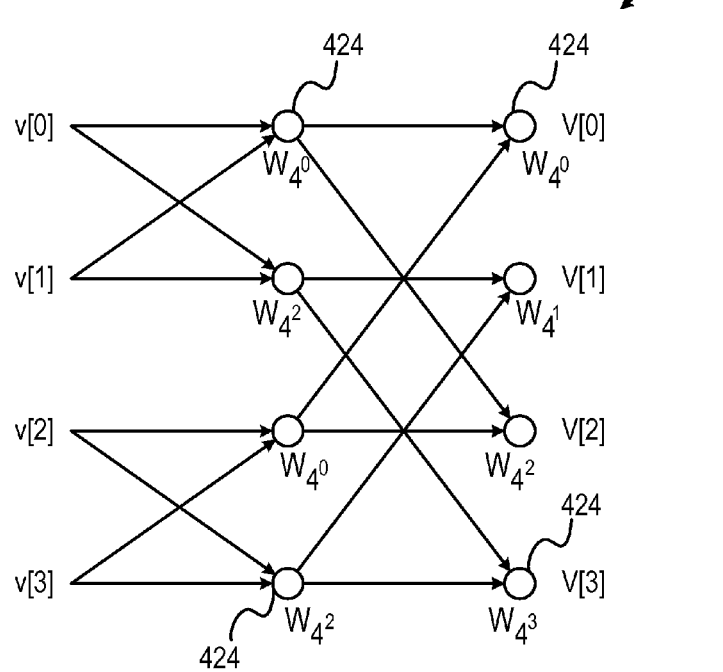
FIG. 19 is a diagram that schematically illustrates a dependency graph representing a Fast Fourier Transform (FFT) computation element, in accordance with an embodiment of the present invention.

Alternatively, the methods and systems described herein can be used to perform computing tasks encountered in applications such as real-time video processing, image processing, Software-Defined Radio (SDR), packet processing in various communication applications and error correction coding. All of these applications typically involve complex computing tasks that can be represented as dependency problems, such as, for example, digital filtering and Fast Fourier Transform (FFT) computation. Such tasks lend themselves naturally to parallelization and solving using the methods and systems described herein. Specific examples of representing a digital filter and an FFT computation element using a dependency graph are shown in FIGS. 18 and 19 below. Once a given computational task (e.g., the examples given herein or any other task) is represented as a dependency graph, it can be parallelized and solved using the methods and systems described herein. As noted above, the dependency graph can be converted to a set of sub-graphs, each sub-graph is compiled to produce a SID, and the GPU executes the SIDs to produce a result.

FIG. 18 is a diagram that schematically illustrates a dependency graph 400 representing a Finite Impulse response (FIR) digital filter, in accordance with an embodiment of the present invention. The digital filter represented by graph 400 filters an input signal x[n] by a set N of filter coefficients denoted $a_0, \ldots, a_{N-1}$, to produce a filtered output signal y[n]. The filter operation is given by $$y[n] = \sum_{i=0}^{N-1} a_i x[n-i]$$

FIR filters of this sort are common in many signal processing applications, such as in communication receivers and transmitters, image processing applications and medical imaging applications.

Graph 400 comprises several types of PEs, e.g., flip-flop PEs 410 that are synchronized to a common clock signal, multiplier PEs 414 and an adder PE 418. The execution dependencies are shown as arrows in the figure. For example, in a given clock cycle, a given multiplier PE 414 can multiply the output of a given flip-flop PE 410 by the corresponding filter coefficient only after the flip-flop PE completed execution and its output is valid. Other kinds of digital filters, such as Infinite Impulse Response (IIR) filters, can also be represented as dependency graphs in a similar manner.

FIG. 19 is a diagram that schematically illustrates a dependency graph 420 representing a Fast Fourier Transform (FFT) computation element, in accordance with an embodiment of the present invention. FFT computation, as is well-known in the art, can be performed efficiently by a set of basic computation elements, sometimes referred to as "butterflies." dependency graph 420 represents a single computation element. In a typical FFT application, multiple such elements are connected in series and/or in parallel. Dependency graph 420 comprises adder/multiplier PEs 424. Each PE 424 accepts two inputs. When a certain PE input is marked with a weight $W_N^K$, the PE multiplies the input by the weight before adding it to the other input. For example, the PE at the top left of the figures produces an output given by $v[0]+v[1] \cdot W_4^0$. $W_N^K$ is given by $W_N^K = e^{(j2\pi K/N)}$. In a typical implementation of N=4, the weights are given by $W_4^0=1$, $W_4^1=i$, $W_4^2=-1$ and $W_4^3=-i$. Alternatively, any other suitable weight values can be used. FFT computation elements of this sort are common in a wide range of applications, such as frequency-domain signal processing and Error Correction Coding (ECC).

Additional Embodiments and Variations

In some embodiments, the compiler applies a process that attempts to merge PEs into PEGs. The output of this process is a graph comprising vertices (representing the PEGs) and edges (representing inter-PEG dependencies). The process typically attempts to group the PEs into PEGs in a way that minimizes the number of inter-PEG dependencies. A grouping of this sort typically results in a SID having less inter-sequence SYNCs. An example merging process is described in section 5.5.1 of U.S. Provisional Patent Application 61/110,676, cited above.

In some embodiments, the compiler attempts to build the SID iteratively, progressing along the PE execution time. In this process, the compiler places the PEs having long Forward Phases (FP) first, and places them in less-populated execution sequences. Moreover, the compiler gives higher priority to placing a PE in a sequence in which it does not require addition of a SYNC. An example SID generation process is described in section 6.3.6 of U.S. Provisional Patent Application 61/110,676, cited above. Generally, the compiler may place the PEs in the execution sequences based on any other criterion or heuristic that considers the FP lengths of the PEs, the occupancy levels of the execution sequences and/or the possible addition of SYNCs.

In some embodiments, the CPU and GPU jointly run an event-driven (EDE) simulator that simulates the dependency problem. Event-driven operation is addressed, for example, in section 6.8 of U.S. Provisional Patent Application 61/079,461, cited above, and in sections 5.1-5.3 of U.S. Provisional Patent Application 61/086,803, cited above. In particular, the compiler may identify cases in which executing a certain SID would trigger execution of another SID within a requirement for immediate update of a simulation running on the CPU. This scheme saves the latency of interaction between the GPU and CPU. This technique is addressed, for example, in section 5.2.1 of U.S. Provisional Patent Application 61/086,803, cited above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computing method, comprising:
accepting a definition of a computing task, which comprises multiple atomic Processing Elements (PEs) having execution dependencies, each execution dependency specifying that a respective first PE is to be executed before a respective second PE;
compiling the computing task for concurrent execution on a multiprocessor device, which comprises multiple processors that are capable of executing a first number of the PEs simultaneously, by arranging the PEs, without violating the execution dependencies, in an invocation data structure comprising a second number of execution sequences that is greater than one but does not exceed the first number; and
invoking the multiprocessor device to run software code that executes the execution sequences in parallel responsively to the invocation data structure, so as to produce a result of the computing task.

2. The method according to claim 1, wherein the computing task comprises a verification task of a design.

3. The method according to claim 1, wherein the computing task comprises one of a signal processing task, an image processing task, a packet processing task and an Error Correction Coding (ECC) task.

4. The method according to claim 1, wherein the multiprocessor device comprises a Graphics Processing Unit (GPU).

5. The method according to claim 1, wherein the multiprocessor device comprises at least one device type selected from a group of types consisting of a Digital Signal Processor and a multi-core Central Processing Unit (CPU).

6. The method according to claim 1, wherein compiling the computing task comprises grouping the PEs in each of the execution sequences into PE Groups (PEGs).

7. The method according to claim 1, wherein the multiprocessor device schedules the PEs for execution by the processors according to a built-in scheduling policy, and wherein invoking the multiprocessor device comprises causing the multiprocessor device to execute the second number of the execution sequences in parallel, as arranged in the execution data structure, irrespective of the built-in scheduling policy.

8. The method according to any of claims 1-7, wherein the multiple processors are arranged in groups, each of the groups assigned to execute one or more blocks of threads provided to the multiprocessor device, and wherein invoking the multiprocessor device comprises providing each execution sequence as a respective block of threads that is to be executed by the processors within one of the groups.

9. The method according to claim 8, wherein the processors within each of the groups access a respective shared memory, and wherein compiling the computing task comprises causing the PEs in a given execution sequence to exchange data via a shared memory of a group of the processors that is assigned to execute the given execution sequence.

10. The method according to any of claims 1-7, wherein arranging the PEs in the invocation data structure comprises minimizing a length of a longest execution sequence, while not exceeding the first number and without violating the execution dependencies.

11. The method according to any of claims 1-7, wherein a given execution dependency specifies that a driving PE is to be executed before a driven PE, and wherein arranging the PEs in the invocation data structure comprises placing the driven PE subsequent to the driving PE in a given execution sequence.

12. The method according to any of claims 1-7, wherein a given execution dependency specifies that a driving PE is to be executed before a driven PE, and wherein arranging the PEs in the invocation data structure comprises placing the driving PE in a first execution sequence, placing the driven PE in a second execution sequence, different from the first execution sequence, and inserting into the second execution sequence a synchronization element that halts execution of the second execution sequence until the given driving PE is fully executed.

13. The method according to any of claims 1-7, wherein compiling the computing task comprises extracting from the computing task multiple a-cyclic sub-graphs, and compiling the multiple sub-graphs to produce respective multiple invocation data structures.

14. The method according to any of claims 1-7, wherein arranging the PEs in the invocation data structure comprises defining an order in which the PEs are to be selected for placement in the execution sequences, and populating the execution sequences with the PEs in accordance with the order.

15. The method according to claim 14, wherein defining the order comprises, for each PE:
determining a first length of a longest chain of the execution dependencies that leads to the PE;
determining a second length of a longest chain of the execution dependencies that begins at the given PE;
determining, based on the first and second lengths, an allocation interval comprising possible positions of the PE along the execution sequences; and
ordering the PEs in ascending order of respective lengths of the allocation intervals.

16. The method according to claim 15, wherein populating the execution sequences comprises placing each PE within the respective allocation interval in one of the execution sequences.

17. The method according to claim 14, wherein defining the order comprises:
identifying output groups, each output group comprising two or more PEs that drive a respective driven PE;
identifying input groups, each input group comprising at least two PEs that are driven by a respective driving PE;
assigning each PE a respective group score based on a number of output and input groups that contain the PE; and
defining the order based on the group scores of the PEs.

18. The method according to any of claims 1-7, wherein arranging the PEs in the invocation data structure comprises, for a given PE and for a set of potential positions within the execution sequences, computing respective allocation costs that would be incurred by placing the given PE at the potential positions, and placing the given PE at one of the potential position having a lowest allocation cost.

19. The method according to claim 18, wherein computing the allocation costs comprises evaluating an allocation cost of a given potential position within a given execution sequence responsively to at least one factor selected from a group of factors consisting of:
   an increase in execution time of the invocation data structure that would be caused by placing the given PE in the given potential position;
   a first number of the PEs in the given execution sequence that share a common driving PE with the given PE;
   a second number of the PEs in the given execution sequence that share a common driven PE with the given PE;
   a third number of the PEs in the given execution sequence that share a common execution dependency with the given PE; and
   a distance from an optimal position computed for the given PE.

20. The method according to any of claims 1-7, wherein arranging the PEs in the invocation data structure comprises arranging the PEs within each execution sequence in warps, each warp comprises one or more PEs of a given type.

21. The method according to any of claims 1-7, wherein compiling the computing task comprises, for a given execution sequence, defining a deterministic caching pattern of fetching variables from a device memory of the multiprocessor device into a cache memory and discarding at least some of the variables from the cache memory during execution of the given execution sequence, and causing the multiprocessor device to carry out the deterministic caching pattern when executing the given execution sequence.

22. The method according to claim 21, wherein the PEs in the given execution sequence are grouped into PE Groups (PEG), and wherein defining the caching pattern comprises:
   for each variable that is present in the cache memory during execution of a given PEG, identifying a respective next PEG in the given execution sequence that will use the variable;
   upon a need to discard one or more of the variables from the cache memory following execution of the given PEG, selecting one of the variables whose respective next PEG has a largest distance from the given PEG along the given execution sequence; and
   defining in the caching pattern that the selected variable is to be discarded following the execution of the given PEG.

23. The method according to claim 21, wherein defining the caching pattern comprises combining fetching of two or more variables in a single fetch command.

24. The method according to claim 23, wherein combining the fetching comprises defining, for each variable, a fetching interval along the given execution sequence that begins when the variable becomes valid and ends when the variable is first used, defining the single fetch command to contain at least two variables whose respective fetching intervals have an overlap, and positioning the single fetch command to occur during the overlap.

25. The method according to claim 24, wherein combining the fetching comprises selecting a given variable to be combined into the single fetch command by identifying the given variable having a smallest distance between a position of the single fetch command and a time at which the given variable is first used.

26. The method according to claim 21, wherein defining the caching pattern comprises combining storage of two or more variables in a single store command.

27. The method according to claim 21, wherein the deterministic caching pattern of the given execution sequence fetches the variables from the device memory at a given order, and wherein compiling the computing task comprises pre-ordering the variables in the device memory in successive addresses according to the given order.

28. The method according to any of claims 1-7, wherein compiling the computing task comprises causing a first execution sequence to provide one or more variables as input to a second execution sequence by accessing a device memory of the multiprocessor device.

29. The method according to any of claims 1-7, wherein compiling the computing task comprises producing multiple invocation data structures, each comprising one or more execution sequences, and causing at least some of the execution sequences to exchange variables between different invocation data structures by accessing a device memory of the multiprocessor device.

30. The method according to claim 29, wherein each of the variables exchanged between the different invocation data structures is produced by one or more source execution sequences and used by one or more target sequences, and wherein compiling the computing task comprises aggregating the variables into groups according to the source and target execution sequences, and storing each of the groups in consecutive addresses in the device memory.

31. The method according to claim 30, wherein causing the execution sequences to exchange the variables comprises causing the execution sequences to read the variables from the device memory in read commands, each read command reading data of a predefined size from one of the groups.

32. The method according to claim 31, and comprising, when the variables in two or more of the groups jointly do not exceed the predefined size, defining a combined read command that reads the variables from the two or more of the groups.

33. The method according to claim 29, and comprising, when a set of multiple execution sequences in a given invocation data structure use a group of the variables, causing only a partial subset of the multiple execution sequences to read the group of the variables from the device memory and to transfer the variables to the other execution sequences in the set.

34. The method according to claim 33, wherein causing the partial subset of the execution sequences to transfer the variables comprises identifying at least one execution sequence in the set that is unable to receive the variables from other execution sequences in the invocation data structure, and adding the identified sequence to the partial subset.

35. The method according to claim 33, wherein causing the partial subset of the execution sequences to transfer the variables comprises identifying synchronization elements in the given invocation data structure, which connect the partial subset to the other execution sequences in the set, and allocating communication resources associated with the synchronization elements for transferring the variables.

36. The method according to any of claims 1-7, wherein compiling the computing task and invoking the multiprocessor device comprise running an event-driven simulation that simulates the computing task.

37. The method according to any of claims 1-7, wherein arranging the PEs in the invocation data structure comprises placing the PEs in the execution sequences in accordance with at least one factor selected from a group of factors consisting of:
- lengths of respective longest chains of the execution dependencies that begin at the PEs;
- respective occupancy levels of the execution sequences; and
- synchronization elements that are incurred by placement of the PEs.

38. A computing method, comprising:
- accepting a definition of a computing task, which comprises multiple atomic Processing Elements (PEs) having execution dependencies, each execution dependency specifying that a respective first PE is to be executed before a respective second PE;
- compiling the computing task for concurrent execution on a multiprocessor device, which comprises multiple processors operating in parallel and schedules the PEs for execution by the processors according to a built-in scheduling policy of the microprocessor device, by arranging the PEs, without violating the execution dependencies, in an invocation data structure comprising multiple execution sequences; and
- invoking the multiprocessor device to run software code that executes the execution sequences in parallel responsively to the invocation data structure and irrespective of the scheduling policy of the multiprocessor device, so as to produce a result of the computing task.

39. A computing apparatus, comprising:
- an interface, which is coupled to accept a definition of a computing task, which comprises multiple atomic Processing Elements (PEs) having execution dependencies, each execution dependency specifying that a respective first PE is to be executed before a respective second PE; and
- a Central Processing Unit (CPU), which is arranged to compile the computing task for concurrent execution on a multiprocessor device, which includes multiple processors that are capable of executing a first number of the PEs simultaneously, by arranging the PEs, without violating the execution dependencies, in an invocation data structure comprising a second number of execution sequences that is greater than one but does not exceed the first number, and to invoke the multiprocessor device to run software code that executes the execution sequences in parallel responsively to the invocation data structure so as to produce a result of the computing task.

40. The apparatus according to claim 39, wherein the computing task comprises a verification task of a design.

41. The apparatus according to claim 39, wherein the computing task comprises one of a signal processing task, an image processing task, a packet processing task and an Error Correction Coding (ECC) task.

42. The apparatus according to claim 39, wherein the multiprocessor device comprises a Graphics Processing Unit (GPU).

43. The apparatus according to claim 39, wherein the multiprocessor device comprises at least one device type selected from a group of types consisting of a Digital Signal Processor and a multi-core Central Processing Unit (CPU).

44. The apparatus according to claim 39, wherein the CPU is arranged to group the PEs in each of the execution sequences into PE Groups (PEGs).

45. The apparatus according to claim 39, wherein the multiprocessor device schedules the PEs for execution by the processors according to a built-in scheduling policy, and wherein the CPU is arranged to cause the multiprocessor device to execute the second number of the execution sequences in parallel, as arranged in the execution data structure, irrespective of the built-in scheduling policy.

46. The apparatus according to any of claims 39-45, wherein the multiple processors are arranged in groups, each of the groups assigned to execute one or more blocks of threads provided to the multiprocessor device, and wherein the CPU is arranged to provide each execution sequence to the multiprocessor device as a respective block of threads that is to be executed by the processors within one of the groups.

47. The apparatus according to claim 46, wherein the processors within each of the groups access a respective shared memory, and wherein the CPU is arranged to cause the PEs in a given execution sequence to exchange data via a shared memory of a group of the processors that is assigned to execute the given execution sequence.

48. The apparatus according to any of claims 39-45, wherein the CPU is arranged to minimize a length of a longest execution sequence in the invocation data structure, while not exceeding the first number and without violating the execution dependencies.

49. The apparatus according to any of claims 39-45, wherein a given execution dependency specifies that a driving PE is to be executed before a driven PE, and wherein the CPU is arranged to place the driven PE subsequent to the driving PE in a given execution sequence.

50. The apparatus according to any of claims 39-45, wherein a given execution dependency specifies that a driving PE is to be executed before a driven PE, and wherein the CPU is arranged to place the driving PE in a first execution sequence, to place the driven PE in a second execution sequence, different from the first execution sequence, and to insert into the second execution sequence a synchronization element that halts execution of the second execution sequence until the given driving PE is fully executed.

51. The apparatus according to any of claims 39-45, wherein the CPU is arranged to extract from the computing task multiple a-cyclic sub-graphs, and to compile the multiple sub-graphs to produce respective multiple invocation data structures.

52. The apparatus according to any of claims 39-45, wherein the CPU is arranged to define an order in which the PEs are to be selected for placement in the execution sequences, and to populate the execution sequences with the PEs in accordance with the order.

53. The apparatus according to claim 52, wherein the CPU is arranged, for each PE, to determine a first length of a longest chain of the execution dependencies that leads to the PE, to determine a second length of a longest chain of the execution dependencies that begins at the given PE, to determine, based on the first and second lengths, an allocation interval comprising possible positions of the PE along the execution sequences, and to order the PEs in ascending order of respective lengths of the allocation intervals.

54. The apparatus according to claim 53, wherein the CPU is arranged to populate the execution sequences by placing each PE within the respective allocation interval in one of the execution sequences.

55. The apparatus according to claim 52, wherein the CPU is arranged to identify output groups, each output group comprising two or more PEs that drive a respective driven PE, to identify input groups, each input group comprising at least two PEs that are driven by a respective driving PE, to assign each PE a respective group score based on a number of output and input groups that contain the PE, and to define the order based on the group scores of the PEs.

56. The apparatus according to any of claims 39-45, wherein the CPU is arranged to compute, for a given PE and for a set of potential positions within the execution sequences, respective allocation costs that would be incurred by placing the given PE at the potential positions, and to place the given PE at one of the potential position having a lowest allocation cost.

57. The apparatus according to claim 56, wherein the CPU is arranged to evaluate an allocation cost of a given potential position within a given execution sequence responsively to at least one factor selected from a group of factors consisting of:
- an increase in execution time of the invocation data structure that would be caused by placing the given PE in the given potential position;
- a first number of the PEs in the given execution sequence that share a common driving PE with the given PE;
- a second number of the PEs in the given execution sequence that share a common driven PE with the given PE;
- a third number of the PEs in the given execution sequence that share a common execution dependency with the given PE; and
- a distance from an optimal position computed for the given PE.

58. The apparatus according to any of claims 39-45, wherein the CPU is arranged to arrange the PEs within each execution sequence in warps, each warp comprises one or more PEs of a given type.

59. The apparatus according to any of claims 39-45, wherein the CPU is arranged to define, for a given execution sequence, a deterministic caching pattern of fetching variables from a device memory of the multiprocessor device into a cache memory and discarding at least some of the variables from the cache memory during execution of the given execution sequence, and to cause the multiprocessor device to carry out the deterministic caching pattern when executing the given execution sequence.

60. The apparatus according to claim 59, wherein the PEs in the given execution sequence are grouped into PE Groups (PEG), and wherein the CPU is arranged to define the caching pattern by:
- for each variable that is present in the cache memory during execution of a given PEG, identifying a respective next PEG in the given execution sequence that will use the variable;
- upon a need to discard one or more of the variables from the cache memory following execution of the given PEG, selecting one of the variables whose respective next PEG has a largest distance from the given PEG along the given execution sequence; and
- defining in the caching pattern that the selected variable is to be discarded following the execution of the given PEG.

61. The apparatus according to claim 59, wherein the CPU is arranged to combine fetching of two or more variables in a single fetch command.

62. The apparatus according to claim 61, wherein the CPU is arranged to define, for each variable, a fetching interval along the given execution sequence that begins when the variable becomes valid and ends when the variable is first used, to define the single fetch command to contain at least two variables whose respective fetching intervals have an overlap, and to position the single fetch command to occur during the overlap.

63. The apparatus according to claim 62, wherein the CPU is arranged to select a given variable to be combined into the single fetch command by identifying the given variable having a smallest distance between a position of the single fetch command and a time at which the given variable is first used.

64. The apparatus according to claim 59, wherein the CPU is arranged to combine storage of two or more variables in a single store command.

65. The apparatus according to claim 59, wherein the deterministic caching pattern of the given execution sequence fetches the variables from the device memory at a given order, and wherein the CPU is arranged to pre-order the variables in the device memory in successive addresses according to the given order.

66. The apparatus according to any of claims 39-45, wherein the CPU is arranged to cause a first execution sequence to provide one or more variables as input to a second execution sequence by accessing a device memory of the multiprocessor device.

67. The apparatus according to any of claims 39-45, wherein the CPU is arranged to produce multiple invocation data structures, each comprising one or more execution sequences, and to cause at least some of the execution sequences to exchange variables between different invocation data structures by accessing a device memory of the multiprocessor device.

68. The apparatus according to claim 67, wherein each of the variables exchanged between the different invocation data structures is produced by one or more source execution sequences and used by one or more target sequences, and wherein the CPU is arranged to aggregate the variables into groups according to the source and target execution sequences, and to store each of the groups in consecutive addresses in the device memory.

69. The apparatus according to claim 68, wherein the CPU is arranged to cause the execution sequences to read the variables from the device memory in read commands, each read command reading data of a predefined size from one of the groups.

70. The apparatus according to claim 69, wherein, when the variables in two or more of the groups jointly do not exceed the predefined size, the CPU is arranged to define a combined read command that reads the variables from the two or more of the groups.

71. The apparatus according to claim 67, wherein, when a set of multiple execution sequences in a given invocation data structure use a group of the variables, the CPU is arranged to cause only a partial subset of the multiple execution sequences to read the group of the variables from the device memory and to transfer the variables to the other execution sequences in the set.

72. The apparatus according to claim 71, wherein the CPU is arranged to identify at least one execution sequence in the set that is unable to receive the variables from other execution sequences in the invocation data structure, and to add the identified sequence to the partial subset.

73. The apparatus according to claim 71, wherein the CPU is arranged to identify synchronization elements in the given invocation data structure, which connect the partial subset to the other execution sequences in the set, and to allocate communication resources associated with the synchronization elements for transferring the variables.

74. The apparatus according to any of claims 39-45, wherein the CPU is arranged to run, jointly with the multiprocessor device, an event-driven simulation that simulates the computing task.

75. The apparatus according to any of claims 39-45, wherein the CPU is arranged to place the PEs in the execution sequences in accordance with at least one factor selected from a group of factors consisting of:
 lengths of respective longest chains of the execution dependencies that begin at the PEs;
 respective occupancy levels of the execution sequences; and
 synchronization elements that are incurred by placement of the PEs.

76. A computing apparatus, comprising:
 an interface, which is coupled to accept a definition of a computing task, which comprises multiple atomic Processing Elements (PEs) having execution dependencies, each execution dependency specifying that a respective first PE is to be executed before a respective second PE; and
 a Central Processing Unit (CPU), which is arranged to compile the computing task for concurrent execution on a multiprocessor device, which comprises multiple processors operating in parallel and schedules the PEs for execution by the processors according to a built-in scheduling policy of the microprocessor device, by arranging the PEs, without violating the execution dependencies, in an invocation data structure comprising multiple execution sequences, and to invoke the multiprocessor device to run software code that executes the execution sequences in parallel responsively to the invocation data structure and irrespective of the scheduling policy of the multiprocessor device so as to produce a result of the computing task.

77. A computing apparatus, comprising:
 a multiprocessor device, which comprises multiple processors that are capable of executing a first number of atomic Processing Elements (PEs) simultaneously; and
 a Central Processing Unit (CPU), which is arranged to accept a definition of a computing task, which comprises multiple PEs having execution dependencies, each execution dependency specifying that a respective first PE is to be executed before a respective second PE, to compile the computing task for concurrent execution on the multiprocessor device by arranging the PEs, without violating the execution dependencies, in an invocation data structure comprising a second number of execution sequences that is greater than one but does not exceed the first number, and to invoke the multiprocessor device to run software code that executes the execution sequences in parallel responsively to the invocation data structure so as to produce a result of the computing task.

78. A computing apparatus, comprising:
 a multiprocessor device, which comprises multiple processors operating in parallel and schedules atomic Processing Elements (PEs) for execution by the processors according to a built-in scheduling policy of the microprocessor device; and
 a Central Processing Unit (CPU), which is arranged to accept a definition of a computing task, which comprises multiple PEs having execution dependencies, each execution dependency specifying that a respective first PE is to be executed before a respective second PE, to compile the computing task for concurrent execution on the multiprocessor device by arranging the PEs, without violating the execution dependencies, in an invocation data structure comprising multiple execution sequences, and to invoke the multiprocessor device to run software code that executes the execution sequences in parallel responsively to the invocation data structure and irrespective of the scheduling policy of the multiprocessor device so as to produce a result of the computing task.

79. A computer software product, the product comprising a computer-readable medium, in which program instructions are stored, which instructions, when read by a computer, cause the computer to accept a definition of a computing task, which comprises multiple atomic Processing Elements (PEs) having execution dependencies, each execution dependency specifying that a respective first PE is to be executed before a respective second PE, to compile the computing task for concurrent execution on a multiprocessor device, which includes multiple processors that are capable of executing a first number of the PEs simultaneously, by arranging the PEs, without violating the execution dependencies, in an invocation data structure comprising a second number of execution sequences that is greater than one but does not exceed the first number, and to invoke the multiprocessor device to run software code that executes the execution sequences in parallel responsively to the invocation data structure so as to produce a result of the computing task.

80. A computer software product, the product comprising a computer-readable medium, in which program instructions are stored, which instructions, when read by a computer, cause the computer to accept a definition of a computing task, which comprises multiple atomic Processing Elements (PEs) having execution dependencies, each execution dependency specifying that a respective first PE is to be executed before a respective second PE, to compile the computing task for concurrent execution on a multiprocessor device, which comprises multiple processors operating in parallel and schedules the PEs for execution by the processors according to a built-in scheduling policy of the microprocessor device, by arranging the PEs, without violating the execution dependencies, in an invocation data structure comprising multiple execution sequences, and to invoke the multiprocessor device to run software code that executes the execution sequences in parallel responsively to the invocation data structure and irrespective of the scheduling policy of the multiprocessor device so as to produce a result of the computing task.

* * * * *